(12) United States Patent
Han et al.

(10) Patent No.: US 12,293,048 B2
(45) Date of Patent: May 6, 2025

(54) DISPLAY DEVICE INCLUDING AN INPUT SENSOR

(71) Applicant: SAMSUNG DISPLAY CO., LTD., Yongin-si (KR)

(72) Inventors: Hyeyun Han, Yongin-si (KR); Wonkyu Kwak, Yongin-si (KR)

(73) Assignee: SAMSUNG DISPLAY CO., LTD., Yongin-si (KR)

( * ) Notice: Subject to any disclaimer, the term of this patent is extended or adjusted under 35 U.S.C. 154(b) by 0 days.

(21) Appl. No.: 18/539,164

(22) Filed: Dec. 13, 2023

(65) Prior Publication Data
US 2024/0329784 A1 Oct. 3, 2024

(30) Foreign Application Priority Data

Mar. 30, 2023 (KR) .......................... 10-2023-0042244

(51) Int. Cl.
G06F 3/044 (2006.01)
G06F 3/041 (2006.01)
(52) U.S. Cl.
CPC .......... *G06F 3/0445* (2019.05); *G06F 3/0412* (2013.01); *G06F 3/0446* (2019.05); *G06F 2203/04112* (2013.01)
(58) Field of Classification Search
USPC ........................................................ 345/174
See application file for complete search history.

(56) References Cited

U.S. PATENT DOCUMENTS

| 10,082,924 | B2 | 9/2018 | Kim et al. | |
|---|---|---|---|---|
| 10,664,083 | B2 | 5/2020 | Ryu et al. | |
| 11,005,057 | B2* | 5/2021 | Zhu | H04M 1/0268 |
| 11,402,958 | B2* | 8/2022 | Kim | G06F 3/0445 |
| 11,500,496 | B2* | 11/2022 | An | G06F 3/0443 |
| 11,523,522 | B2 | 12/2022 | Lee et al. | |
| 2018/0129352 | A1* | 5/2018 | Kim | G06F 3/0446 |
| 2019/0097171 | A1* | 3/2019 | Park | H10K 59/873 |
| 2019/0171318 | A1* | 6/2019 | Ryu | H10K 59/40 |
| 2020/0066804 | A1* | 2/2020 | Jung | H10K 50/858 |
| 2020/0152710 | A1* | 5/2020 | An | H10K 50/8445 |
| 2021/0271367 | A1* | 9/2021 | Park | G06F 3/04164 |
| 2022/0223656 | A1* | 7/2022 | Kim | G06F 3/0446 |
| 2022/0269370 | A1* | 8/2022 | Baek | G06F 3/0446 |

(Continued)

FOREIGN PATENT DOCUMENTS

| CN | 112071471 A | 12/2020 |
|---|---|---|
| KR | 10-214784281 | 8/2020 |

(Continued)

*Primary Examiner* — Amy Onyekaba
(74) *Attorney, Agent, or Firm* — CHAU & ASSOCIATES, LLC

(57) ABSTRACT

A display device includes a display panel including an emission area and a non-emission area proximate to the emission area, and an input sensor disposed on the display panel. The input sensor includes a first sensor conductive layer disposed on the display panel, a first sensor insulation layer disposed on the first sensor conductive layer, and a second sensor conductive layer disposed on the first sensor insulation layer. The first sensor conductive layer and/or the second sensor conductive layer includes sides on which mesh openings overlapping the emission area are defined, wherein recesses are defined in the sides.

20 Claims, 18 Drawing Sheets

(56) References Cited

U.S. PATENT DOCUMENTS

2022/0413657 A1* 12/2022 Byun .................... G06F 3/0443
2023/0276681 A1*  8/2023 Kim ..................... H10K 59/40
2023/0315224 A1* 10/2023 Lee ..................... G06F 3/0416
                                                      345/175

FOREIGN PATENT DOCUMENTS

KR       10-2423636 B1     7/2022
KR       10-2480088 B1    12/2022

* cited by examiner

DISPLAY DEVICE INCLUDING AN INPUT SENSOR

CROSS-REFERENCE TO RELATED APPLICATIONS

This U.S. non-provisional patent application claims priority under 35 U.S.C. § 119 to Korean Patent Application No. 10-2023-0042244, filed on Mar. 30, 2023, the entire contents of which are hereby incorporated by reference.

TECHNICAL FIELD

The present disclosure herein relates to a display device including a display panel and an input sensor.

DISCUSSION OF THE RELATES ART

A multimedia device such as a television, a tablet computer, a vehicle navigation device, a game console or the like may display an image to a user through a display screen, and provide a touch-based input method which enables the user to intuitively and conveniently input information or commands. The display device may include a display panel and an input sensor configured to sense a touch of the user. The input sensor may include a conductor configured to sense an external input, and the conductor of the input sensor disposed on the display panel may adversely affect the light extraction efficiency or an external light reflection ratio.

SUMMARY

A display device includes a display panel including an emission area and a non-emission area proximate to the emission area. An input sensor is disposed on the display panel. The input sensor includes a first sensor conductive layer disposed on the display panel, a first sensor insulation layer disposed on the first sensor conductive layer, and a second sensor conductive layer disposed on the first sensor insulation layer. At least one of a side of the first sensor conductive layer and a side of the second sensor conductive layer includes a recess and a mesh opening overlapping the emission area.

The second sensor conductive layer may include a first conductive layer, a second conductive layer, and a third conductive layer that are laminated in a thickness direction of the input sensor. The second conductive layer may include a different material from each of the first conductive layer and the third conductive layer.

The first conductive layer and the third conductive layer may include a same material.

The second conductive layer may include gold, silver, copper, aluminum, platinum, or an alloy thereof.

The recess may be defined in the side of the second conductive layer, the side of the first conductive layer and a side of the third conductive layer may each protrude to a greater extent than the side of the second conductive layer.

The input sensor may further include a second sensor insulation layer disposed on the second sensor conductive layer. The second sensor insulation layer may contact the side of the second conductive layer that includes the recess defined therein.

The first sensor conductive layer may include a fourth conductive layer, a fifth conductive layer, and a sixth conductive layer that are laminated in the thickness direction of the input sensor, and the fifth conductive layer may include a different material from that of the fourth conductive layer and the sixth conductive layer.

The fifth conductive layer of the first sensor conductive layer may include a same material as the second conductive layer of the second sensor conductive layer.

The recess may be defined in a side of the fifth conductive layer of the first sensor conductive layer, and a side of the fourth conductive layer and a side of the sixth conductive layer may protrude to a greater extent than the side of the fifth conductive layer.

The first sensor conductive layer and the second sensor conductive layer may each include a first mesh pattern and a second mesh pattern. At least a portion of the second mesh pattern of the second sensor conductive layer may correspond to first sensing patterns arranged in a first direction and second sensing patterns electrically insulated from the first sensing patterns and arranged in a second direction intersecting with the first direction.

At least a portion of the first mesh pattern may correspond to trace lines connected to corresponding first sensing patterns among the first sensing patterns through a contact part penetrating through the first sensor insulation layer.

The recess may be defined in a side of the second mesh pattern, and a linewidth of the first mesh pattern overlapping the second mesh pattern may be smaller than that of the second mesh pattern.

The recess may be defined in a side of the first mesh pattern, and a linewidth of the second mesh pattern overlapping the first mesh pattern may be smaller than that of the first mesh pattern.

The recess may be defined in a side of the first mesh pattern and a side of the second mesh pattern, and a linewidth of the first mesh pattern may be substantially equal to that of the second mesh pattern.

A display device includes a display panel including a display area, and an input sensor including a sensing area overlapping the display area and disposed on the display panel. The input sensor includes first sensing electrodes, each of which comprises first sensing patterns arranged in a first direction, the first sensing electrodes disposed on the sensing area, and second sensing electrodes, each of which comprises second sensing patterns arranged in a second direction intersecting with the first direction, the second sensing electrodes disposed on the sensing area. Each of the first sensing patterns and the second sensing patterns includes a recess and a mesh opening.

Each of the first sensing patterns and the second sensing patterns may include a first conductive layer, a second conductive layer, and a third conductive layer that are laminated in a thickness direction of the input sensor. The second conductive layer may include a different material from that of the first conductive layer and the third conductive layer, and the recess may be defined in a side of the second conductive layer.

The input sensor may further include trace lines disposed on a different layer from the first sensing patterns, and respectively connected to the first sensing electrodes through a contact part. The contact part may overlap the sensing area.

A linewidth of the trace lines may be smaller than that of the first sensing patterns.

The trace lines may include a fourth conductive layer, a fifth conductive layer, and a sixth conductive layer that are laminated in the thickness direction of the input sensor. The fourth to sixth conductive layers may respectively include same materials as the first to third conductive layers.

The recess may be defined in a side of the fifth conductive layer of the trace lines.

BRIEF DESCRIPTION OF THE FIGURES

The accompanying drawings are included to provide a further understanding of the inventive concept, and are incorporated in and constitute a part of this specification. The drawings illustrate embodiments of the inventive concept and, together with the description, serve to explain principles of the inventive concept. In the drawings.

DETAILED DESCRIPTION

Figure 1:
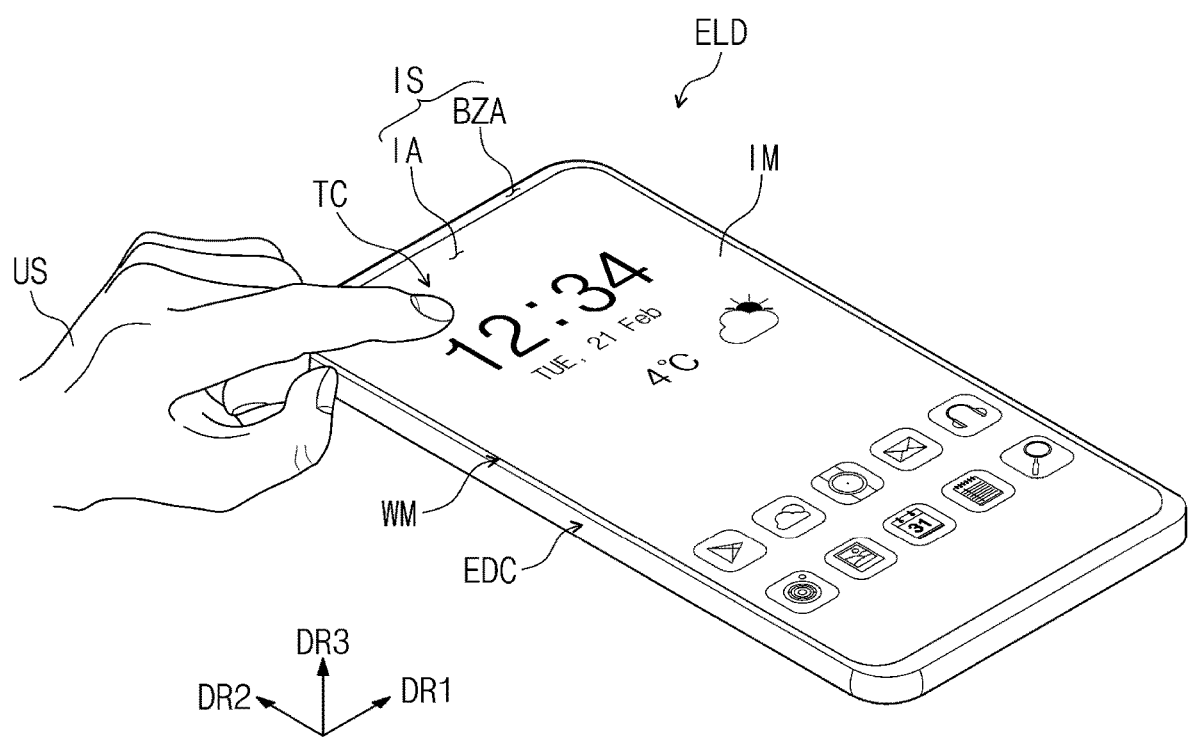
FIG. 1 is a perspective view of an electronic device according to an embodiment of the inventive concept.

The present invention may be variously modified and realized in various forms, and thus specific embodiments will be exemplified in the drawings and described in detail hereinafter. However, it will be understood that the present invention is not necessarily limited to the specific forms set forth herein, and all changes, equivalents, and substitutions included in the technical scope and spirit of the present invention are included.

It will be understood that when an element or layer is referred to as being "on", "connected to" or "coupled to" another element or layer, it can be directly on, connected or coupled to the other element or intervening elements may be present.

Like reference numerals may refer to like elements in the drawings and the specification. The term "and/or" includes all combinations of one or more of which associated configurations may define.

Terms such as first, second, and the like may be used to describe various elements, but these elements should not necessary be limited by the terms. These terms are used to distinguish one element from another. For instance, a first component may be referred to as a second component, or similarly, a second component may be referred to as a first component, without departing from the scope of the present disclosure. The singular expressions include plural expressions unless the context clearly dictates otherwise.

In addition, terms such as "below," "lower," "above," "upper," and the like are used to describe the relationship of the configurations shown in the drawings. The terms are used as a relative concept and are described with reference to the direction indicated in the drawings.

It should be understood that the terms "comprise" or "have" are intended to specify the presence of stated features, integers, steps, operations, elements, components, or combinations thereof in the disclosure, but do not necessarily preclude the presence or addition of one or more other features, integers, steps, operations, elements, components, or combinations thereof.

Hereinafter, a display device, according to an embodiment of the inventive concept, will be described with reference to the drawings.

Figure 2:
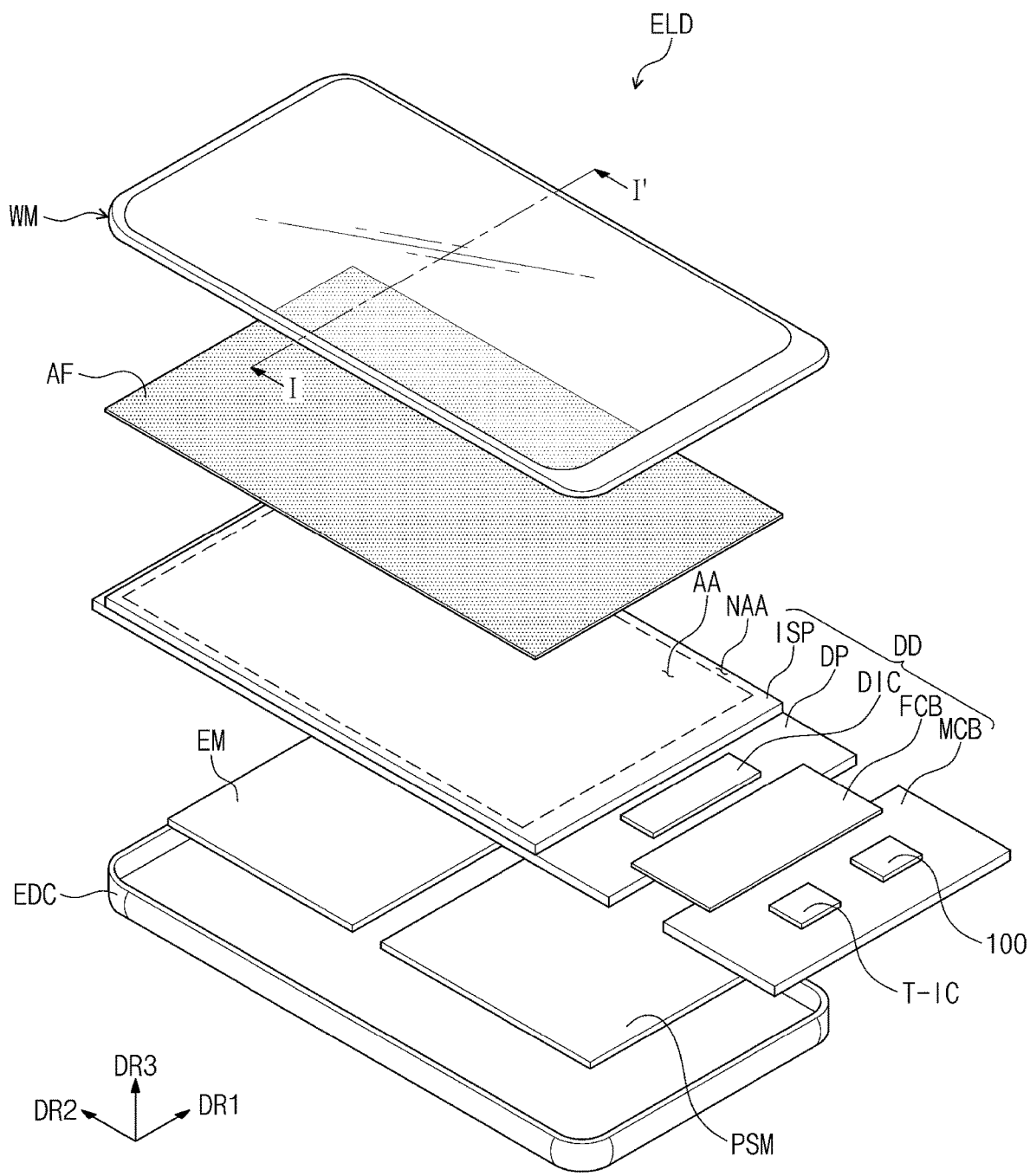
FIG. 2 is an exploded perspective view of an electronic device according to an embodiment of the inventive concept.

FIG. 1 is a perspective view of an electronic device ELD according to an embodiment of the inventive concept. FIG. 2 is an exploded perspective view of the electronic device ELD according to an embodiment of the inventive concept.

Referring to FIG. 1, the electronic device ELD may be activated in response to an electrical signal and display an image IM. For example, the electronic device ELD may be a large-sized device such as a television, a digital billboard or the like, or a small and medium-sized device such as a computer monitor, a mobile phone, a tablet computer, a navigation system, a game console or the like. However, the examples of the electronic device ELD are illustrative, and are not necessarily limited to any one as long as they do not depart from the inventive concept.

The electronic device ELD may be rigid or flexible. The term "flexible" means that the electronic device may be flexed to a noticeable extent without cracking or otherwise sustaining damage. For example, the flexible electronic device ELD may include a curved device, a rollable device, or a foldable device.

In the embodiment, a third direction DR3 may be parallel to a normal direction to a plane defined by a first direction DR1 and a second direction DR2. The front surface (or top surface) and the rear surface (or bottom surface) of each member that constitutes the electronic device ELD may be opposing to each other in the third direction, and each normal direction of the front surface and rear surface may be substantially parallel to the third direction DR3. The spacing distance between the front and rear surface defined along the third direction DR3 may correspond to the thickness of the member.

In the specification, the expression "in a plan view" may mean a state of being viewed in the third direction DR3. In the present specification, the expression "in a cross-sectional view" may mean a state of being viewed in the first direction DR1 or the second direction DR2. On the other hand, the directions indicated by the first to third directions DR1, DR2, and DR3 are relative concepts to each other and may be changed to other directions.

The display device ELD may display an image IM on a display surface IS that is parallel to a plane defined by the first direction DR1 and the second direction DR2 in the third direction DR3. The embodiment is not necessarily limited thereto, and the display surface IS may further include a curved surface bent from at least one side of the plane. The display surface IS, on which the image IM is displayed, may correspond to the front surface of the electronic device ELD. The image IM may include a still image as well as a moving image. FIG. 1 illustrates example icon images and a watch widget.

The electronic device ELD may have, in a plan view, a rectangular shape including a pair of short sides extending in the first direction DR1 and a pair of long sides extending in the second direction DR2. However, the embodiment is not necessarily limited thereto, and the electronic device ELD may have, in a plan view, various shapes such as circular or polygonal shapes.

The electronic device ELD may sense an external input TC applied from the outside. The external input TC may include inputs of various forms such as force, pressure, temperature, or light. In the embodiment, the external input TC is shown as a touch input with the hand of a user US applied onto the front surface of the electronic device ELD. However, the embodiment is an example, and the external input TC may include all the inputs that change the static capacity of the input sensor. In addition, an area in which the electronic device ELD senses the external input TC is not necessarily limited to the front surface of the electronic device ELD, and, according to the structure of the electronic device ELD, the electronic device ELD may sense the external input TC of the user US applied to the side or the rear surface of the electronic device ELD.

The display surface IS of the electronic device ELD may include an image area IA and a bezel area BZA. The image area IA may be an area in which the image IM is displayed. The user US may visually recognize the image IM through the image area IA. In the embodiment, the image area IA may be shown as having a rectangular shape of which vertices are round, but this is an example and the image area IA may have various shapes.

The bezel area BZA may have a prescribed color and be a light-blocking area. The bezel area BZA may be adjacent to the image area IA. For example, the bezel area BAZ may be disposed outside the image area IA and may at least partially surround the image area IA. Accordingly, the shape of the image area IA may be substantially defined by the bezel area BZA. However, this is an example, and the bezel area BZA may be disposed adjacent only to one side of the image area IA among the sides of the electronic device ELD, or may be omitted.

Referring to FIGS. 1 and 2, the electronic device ELD may include a window WM, a display device DD, an optical element AF, an electronic module EM, a power supply module PSM, and a device case EDC.

The window WM may be disposed on the display device DD and the optical element AF. The window WM may protect the display device DD from an external shock or scratch applied from the outside. The front surface of the window WM may correspond to the display surface IS of the electronic device ELD.

The optical element AF may be disposed on the display device DD. The optical element AF may include various embodiments in which a reflection ratio of external light is reduced. For example, the optical element AF may include a polarization film including a phase retarder (e.g., a half-wave or quarter-wave plate) and/or a polarizer, multiple reflection layers configured to make two beams of reflection light destructively interfere with each other, or color filters disposed to correspond to a pixel array and emission colors of the display panel DP.

The display device DD may generate the image IM output outside the electronic device ELD, and sense the external input TC. The display device DD may include a display panel DP and an input sensor ISP.

The display panel DP may display the image IM in response to an electrical signal. The display panel DP according to an embodiment may be an emissive display panel, and is not necessarily limited thereto. For example, the display panel DP may be an organic light emitting display penal, an inorganic light emitting display panel, or a quantum dot light emitting display panel. Hereinafter, the display panel DP will be described as the organic light emitting display panel.

The input sensor ISP may be disposed on the display panel DP. The input sensor may provide an input signal including information about the external input TC so that the display panel DP detects the external input TC to generate the image IM corresponding to the external input TC. The input sensor ISP may be driven in various types including a static capacitive type, a resistive film type, an infrared ray type, a sound wave type, or a pressure type, and the driving way is not necessarily limited to any one type. In the embodiment, the input sensor ISP will be described to be driven in the static capacitive type.

The display device DD may include an active area AA and a non-active area NAA adjacent to the active area AA. The active area AA may be an area in which light emitting elements of the display panel DP, or the sensing electrode of the input sensor ISP may be disposed, and may be activated by an electrical signal to display the image, or detect the external input TC. The non-active area NAA may be an area in which a driving circuit, signal lines, pads and the like for driving the elements disposed in the active area AA may be disposed.

The active area AA may overlap the image area IA of the electronic device ELD, and the non-active area NAA may overlap the bezel area BZA of the electronic device ELD. Components disposed in the non-active area NAA may be prevented, by the bezel area BZA, from being visually recognized from the outside.

The display device DD may further include a main circuit board MCB, a flexible circuit film FCB, a driving circuit DIC, a sensor control circuit T-IC, and a main controller 100.

The main circuit board MCB may include driving elements. The main circuit board MCB may be electrically connected to the display panel DP and the input sensor ISP through the flexible circuit film FCB. The main circuit board MCB may be electrically connected to the electronic module EM through a connector.

The flexible circuit film FCB may be connected to the display panel DP to electrically connect the display panel DP and the main circuit board MCB. The input sensor ISP may be electrically connected to the display panel DP to be electrically connected to the main circuit board MCB through the flexible circuit film FCB. However, the embodiment is not necessarily limited thereto, and the input sensor ISP may be electrically connected to the main circuit board MCB through an additional flexible circuit film, or directly connected onto the display panel DP.

The driving circuit DIC, the sensor control circuit T-IC, and the main controller 100 may be provided as an integrated chip. The data driving unit DIC may be mounted on the display panel DP, and the sensor control circuit T-IC and the main controller 100 may be mounted on the main circuit board MCB. However, the embodiment is not necessarily limited thereto. For example, the data driving unit DIC may be mounted on the flexible circuit film FCB.

The main controller 100 may control the overall operations of the electronic device ELD. For example, the main driving unit 100 may control the operations of the display panel DP and the input sensor ISP. In addition, the main controller 100 may control the operation of the electronic module EM. The main controller 100 may include at least one microprocessor.

The data driving unit DIC may include a driving circuit for driving the pixels of the display panel DP. The data driving unit DIC may receive image data and a control signal from the main control unit 100. For example, the control signal may include an input vertical sync signal, an input horizontal sync signal, a main clock, a data enable signal, and the like.

The sensor control circuit T-IC may provide an electrical signal for driving the input sensor ISP to the input sensor ISP. The sensor control circuit T-IC may receive a control signal such as a clock signal from the main controller 100.

The electronic module EM may include various functional modules required for driving the display device DD. For example, the electronic module EM may include a wireless communication module, an image input module, an acoustic input module, an acoustic output module, a memory, an external interface module and the like. The aforementioned modules of the electronic module EM may be mounted on the main circuit board MCB, or may be electrically connected to the main circuit board MCB through a separate flexible circuit board.

The power supply module PSM may be electrically connected to the electronic module EM. The power supply module PSM may supply power required for the overall operations of the electronic device ELD. For example, the power supply module PSM may include a typical battery device.

The window WM and the device case EDC may be combined to each other to constitute the appearance of the electronic device ELD. The window WM and the device case EDC may be combined to each other to provide an internal space in which the components of the electronic device ELD are arranged. In the internal space, the display device DD, the flexible circuit film FCB, the main circuit board MCB, the electronic module, and the power supply module PSM may be arranged. The display panel DP may be bent and disposed in the device case EDC such that the flexible circuit film FCB and the main circuit board MCB face the rear surface of the display panel DP.

The device case EDC may include a material of a relatively high rigidity. For example, the device case EDC may include a frame and/or plate including glass, plastic, metal, or a combination thereof. The device case EDC may absorb an impact applied the outside, block permeation of foreign matter/moisture or the like from the outside to protect the display device DD disposed therein.

Figure 3A:
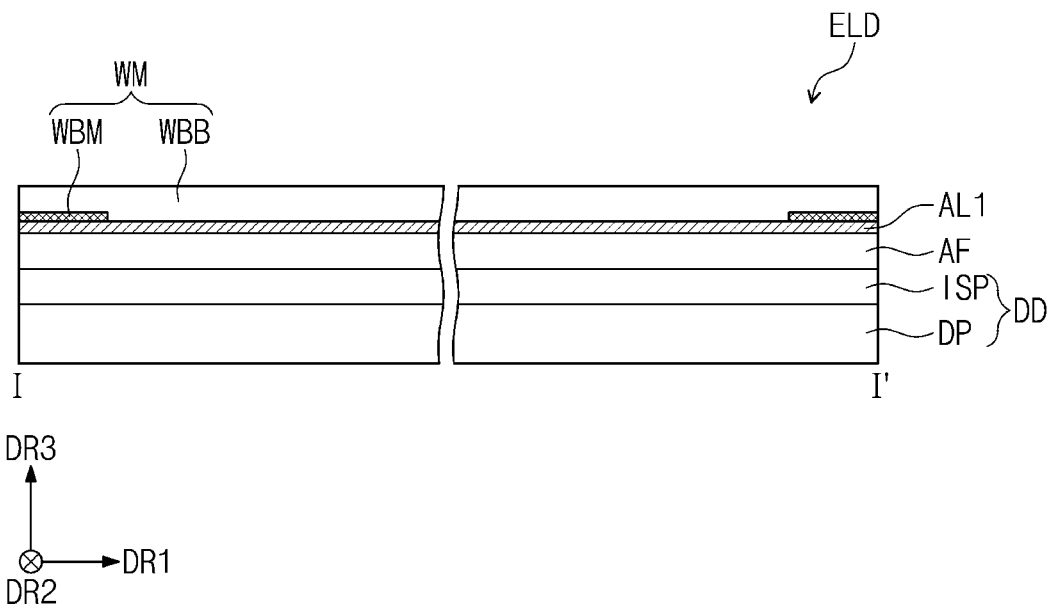
FIGS. 3A and 3B are cross-sectional views of the electronic device cut along the line I-I' shown in FIG. 2.
Figure 3B:
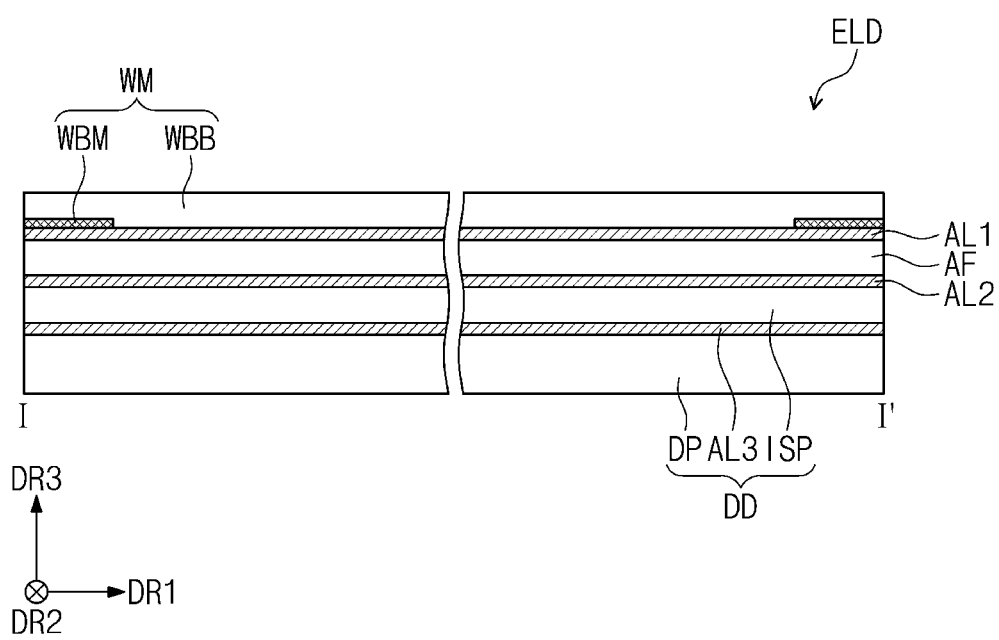

FIGS. 3A and 3B are cross-sectional views of the electronic device ELD cut along line I-I' shown in FIG. 2. FIGS. 3A and 3B illustrate various embodiments according to a laminate type of the components included in the electronic device ELD, and for the description of the window WM, the display panel DP, and the input sensor ISP, the above description may be applied.

Referring to FIGS. 3A and 3B, the window WM may include a base film WBB and a bezel pattern WBM. The base film WBB may include an optically transparent insulation material. The base film WBB may include a glass film and/or a synthetic resin film. The base film WBB may have a single layer structure or a multilayer structure to which a plurality of films are combined. The window WM may further include functional layers such as a fingerprint prevention layer, a phase control layer, or a hard core layer that is disposed on the base film WBB.

The bezel pattern WBM may be a color layer disposed on one surface of the base film WBB. The bezel pattern WBM may include a colored material. For example, the bezel pattern WBM may include a colored organic film. The bezel pattern WBM may have a single layer or multilayer structure. The bezel pattern WBM of multilayer structure may include a color layer of a chromatic color and a light shield layer of an achromatic color (e.g., black). The bezel pattern WBM may be disposed through a deposition, printing, or coating process.

The bezel pattern WBM may correspond to the bezel area BZA (see FIG. 1) of the electronic device ELD. A partial area of the window WM on which the bezel pattern WBM is disposed may have a lower light transmittance than an area without the bezel pattern WBM.

A first adhesive layer AL1 may be disposed between the window WM and the optical element AF. The window WM and the optical element AF may be combined through the first adhesive layer AL1. However, the embodiment is not necessarily limited thereto, and the first adhesive layer WM may be disposed directly on the optical element AF.

In the specification, an expression "A is disposed directly on B" indicates that "B" is disposed on "A" through continuous processes without a separate adhesive layer or an adhesive element disposed between "A" and "B".

Referring to FIG. 3A, the input sensor ISP may be disposed directly on the display panel DP. In the manufacturing process of the display device DD, the input sensor ISP may be provided through continuous processes on a base surface provided in the display panel DP. The input sensor ISP may be integrally combined with the display panel DP without the use of a separate adhesive layer.

Referring to FIG. 3A, the optical element AF may be disposed directly on the display device DD. For example, the optical element AF may be provided through continuous processes on the top surface of the input sensor ISP. The optical element AF may include a color filter, and may be provided by applying and patterning the composition of the color filter or printing the color filter on the base surface provided in the input sensor ISP.

However, the embodiment is not necessarily limited thereto and, with reference to FIG. 3B, the optical element AF may be combined onto the display device DD through a second adhesive layer AL2. For example, the optical element AF may be provided in a film type such as a polarization film, and may be combined with the display device DD through the second adhesive layer AL2 disposed on the top surface of the input sensor ISP.

Referring to FIG. 3B, the display device DD may further include a third adhesive layer AL3 disposed between the input sensor ISP and the display panel DP. The input sensor ISP may be combined with the display panel DP through the third adhesive layer AL3. For example, the input sensor ISP may be provided to a touch panel manufactured through separate processes from the manufacturing processes of the display panel DP, and the input sensor ISP may be combined with the display panel DP through the third adhesive layer AL3 disposed on the top surface of the display panel DP.

The aforementioned first to third adhesive layers AL1, AL2, AL3 may each include a transparent adhesive such as an optically clear adhesive film (OCA), an optically clear resin (OCR), or a pressure sensitive adhesive film (PSA) or the like. However, the embodiment is not necessarily limited thereto.

The laminate configuration and the laminate order of each of the electronic devices ELD shown in FIGS. 3A and 3B are examples, and are not necessarily limited thereto. For example, the electronic device ELD may further include a protection layer disposed under the display panel DP, or the optical element AF may be omitted. In addition, the laminate order of the optical element AF and the input sensor ISP may be changed, and the optical element AF may be disposed between the display panel DP and the input sensor ISP.

Figure 4A:
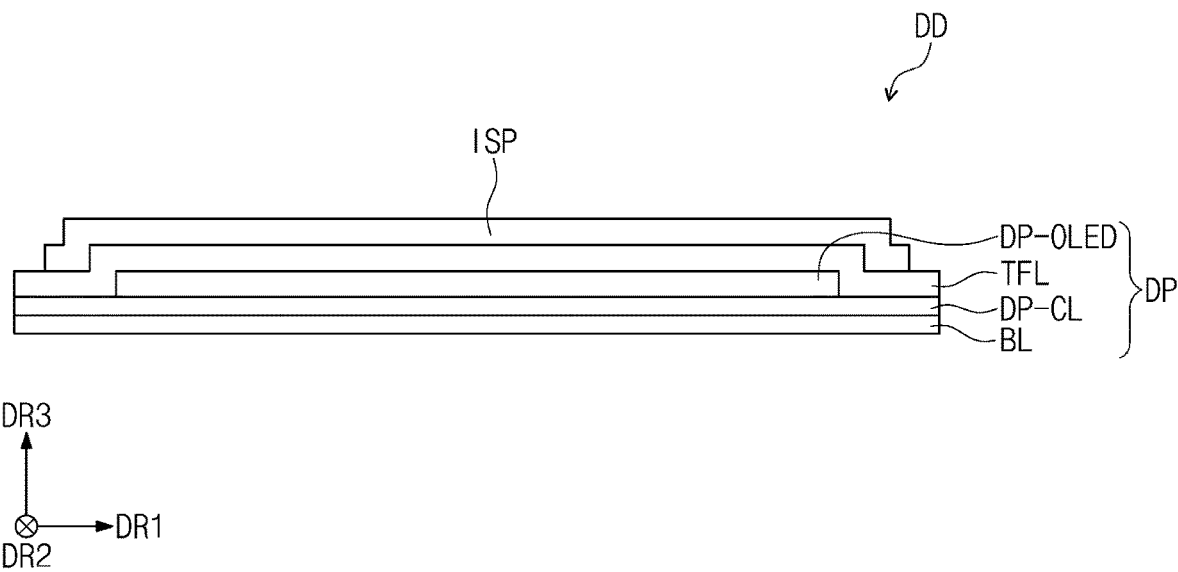
FIGS. 4A to 4C are cross-sectional views of a display device according to an embodiment of the inventive concept.
Figure 4B:
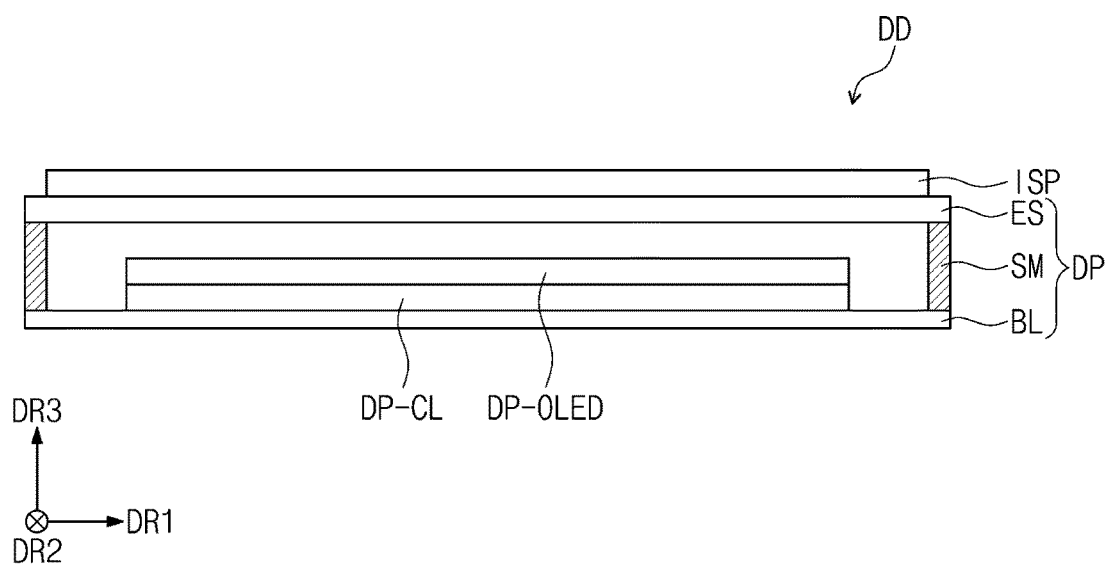
Figure 4C:
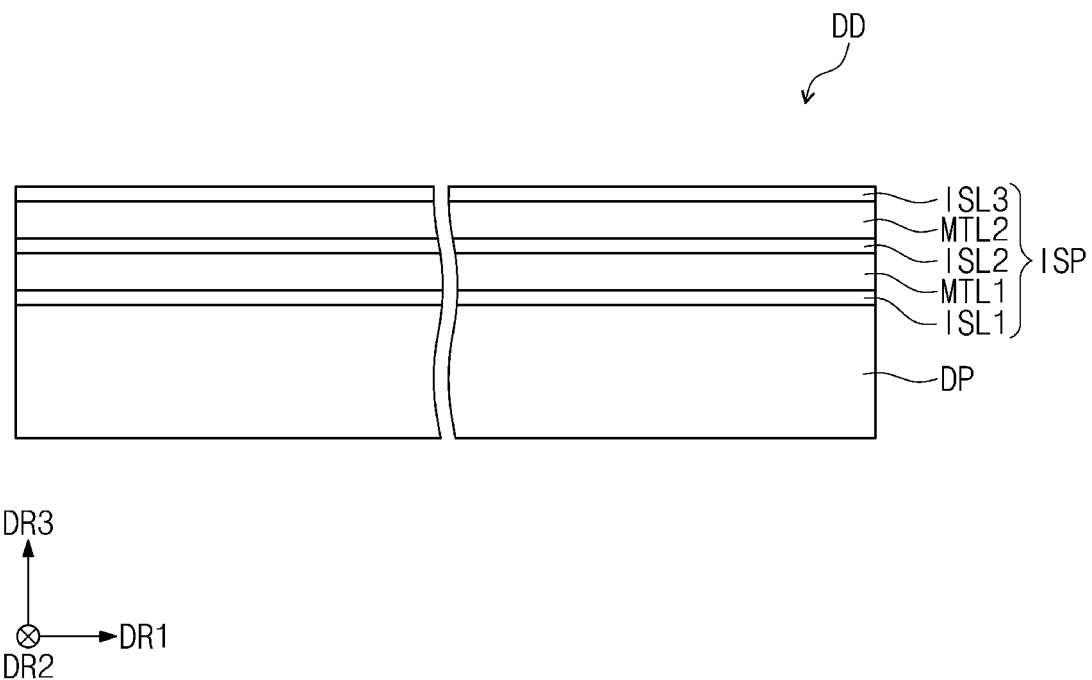

FIGS. 4A to 4C are cross-sectional views of the display device DD according to an embodiment of the inventive concept. For the description of the display panel DP and the input sensor ISP shown in FIGS. 4A to 4C, the above description may be applied.

Referring to FIG. 4A, the display panel DP may include a base layer BL, a circuit element layer DP-CL, a light emitting element layer DP-OLED, and an encapsulation layer TFL.

The base layer BL may provide a base surface with the circuit element layer DP-CL disposed thereon. The base layer BL may be a rigid substrate, or a flexible substrate that is bendable, foldable, rollable or the like. The base layer BL may include a plastic substrate, a glass substrate, a metal substrate, an organic/inorganic composite material substrate or the like. The base layer BL may have a multilayer structure. For example, the base layer BL may include an inorganic layer, a synthetic resin layer, or a composite material layer.

The circuit element layer DP-CL may be disposed on the base layer BL. The circuit element layer DP-CL may include at least one insulation layer, a semiconductor pattern, and a conductive pattern. The insulation layer, the semiconductor layer, and the conductive layer may be disposed on the base layer BL through coating, deposition or the like, and then the insulation layer, the semiconductor layer and the conductive layer may be patterned through repetitive photolithography to provide the insulation layer, the semiconductor pattern, and the conductive pattern of the circuit element layer DP-CL. The insulation layer, the semiconductor pattern, and the conductive pattern included in the circuit element layer DP-CL may provide the driving elements such as transistors, the signal lines or the pads in the circuit element layer DP-CL.

The display element layer DP-OLED may be arranged on the circuit element layer DP-CL. The display element layer DP-OLED may include light emitting elements. The light emitting elements of the display element layer DP-OLED may be electrically connected to the driving elements of the circuit element layer DP-CL and may generate light in response to signals provided by the driving elements to display an image.

The encapsulation layer TFL may be disposed on the display element layer DP-OLED to encapsulate the light emitting elements. The encapsulation layer TFL may include at least one thin film for increasing the optical efficiency of the display element layer DP-OLED, or protecting the display element layer DP-OLED.

Referring to FIG. 4B, the display panel DP of an embodiment may include the base layer BL, the circuit element layer DP_CL, the display element layer DP-OLED, the encapsulation substrate ES, and a sealant SM.

The circuit element layer DP-CL may be disposed on the base layer BL, and the display element layer DP-OLED may be disposed on the circuit element layer DP-CL. For the description of the circuit element layer DP-CL and the display element layer DP-OLED, the above description may be applied.

The sealant SM may be disposed between the base layer BL and the encapsulation substrate ES. The sealant SM may combine the base layer BL and the encapsulation substrate ES. The sealant SM may include an organic adhesive, a frit or the like.

The encapsulation substrate ES may be disposed on the display element layer DP-OLED. The base layer BL and the encapsulation substrate ES may each include a plastic substrate, a glass substrate, a metal substrate, an organic/inorganic composite material substrate or the like. The encapsulation substrate ES may be spaced apart from the display element layer DP-OLED so as to have a prescribed gap in the third direction DR3. In an embodiment, the display panel DP may further include a filling layer filling the gap. The filling layer may include an absorbing agent or a resin material.

Referring to FIG. 4C, the input sensor ISP may include a sensor base layer ISL1, a first sensor conductive layer MTL1, a first sensor insulation layer ISL2, a second sensor conductive layer MTL2, and a second sensor insulation layer ISL3. The sensor base layer ISL1 may be disposed directly on the display panel DP. However, the embodiment is not necessarily limited thereto, and the sensor base layer ISL1 may be omitted and, in this case, the first sensor conductive layer MTL1 may be disposed directly on the display panel DP.

The first sensor conductive layer MTL1 and the second conductive layer MTL2 may each have a single layer or a multilayer structure. The conductive layer of the multilayer structure may have two or more transparent conductive layers and/or metal layers laminated. For example, the conductive layer of the multilayer structure may be a structure in which a transparent conductive layer and a metal layer are laminated or metal layers including different metals are laminated.

The transparent conductive layer, which is included in the first sensor conductive layer MTL1 and the second sensor conductive layer MTL2, may include indium tin oxide (ITO), indium zinc oxide (IZO), zinc oxide (ZnO), indium tin zinc oxide (ITZO), PEDOT, a metal nanowire, or graphene, etc. The metal layer, which is included in the first sensor conductive layer MTL1 and the second sensor conductive layer MTL2, may include molybdenum, silver, copper, aluminum, or an alloy thereof.

Between the first sensor conductive layer MTL1 and the second sensor conductive layer MTL2 of the multilayer, a metal having a relatively high durability and a low reflection ratio may be applied to an outer layer of the sensor conductive layers, and a metal having a high electrical conductivity may be applied to an inner layer of the sensor conductive layers. For example, the first sensor conductive MTL1 and the second sensor conductive layer MTL2 may each have a three layer structure of titanium/aluminum/titanium.

The first sensor conductive MTL1 and the second sensor conductive layer MTL2 may include sensing electrodes TE (see FIGS. 6A and 6B) of the input sensor ISP to be described below, and may further include trace lines TL (see FIGS. 6A and 6B).

The first sensor insulation layer ISL2 may be disposed on the first sensor conductive layer MTL1. The second sensor insulation layer ISL3 may be disposed on the second sensor conductive layer MTL2. The first insulation layer ISL2 and the second insulation layer ISL3 may each include an inorganic film or an organic film.

For example, the inorganic film may include aluminum oxide, titanium oxide, silicon oxide, silicon oxynitride, zirconium oxide, and/or hafnium oxide. The organic film may include an acrylic-based resin, an methacrylic-based resin, a polyisoprene-based resin, a vinyl-based resin, an epoxy-based resin, a urethane-based resin, a cellulose-based resin, a siloxane-based resin, a polyamide-based resin, a perylene-base resin, and/or a polyimide-based resin.

Figure 5:
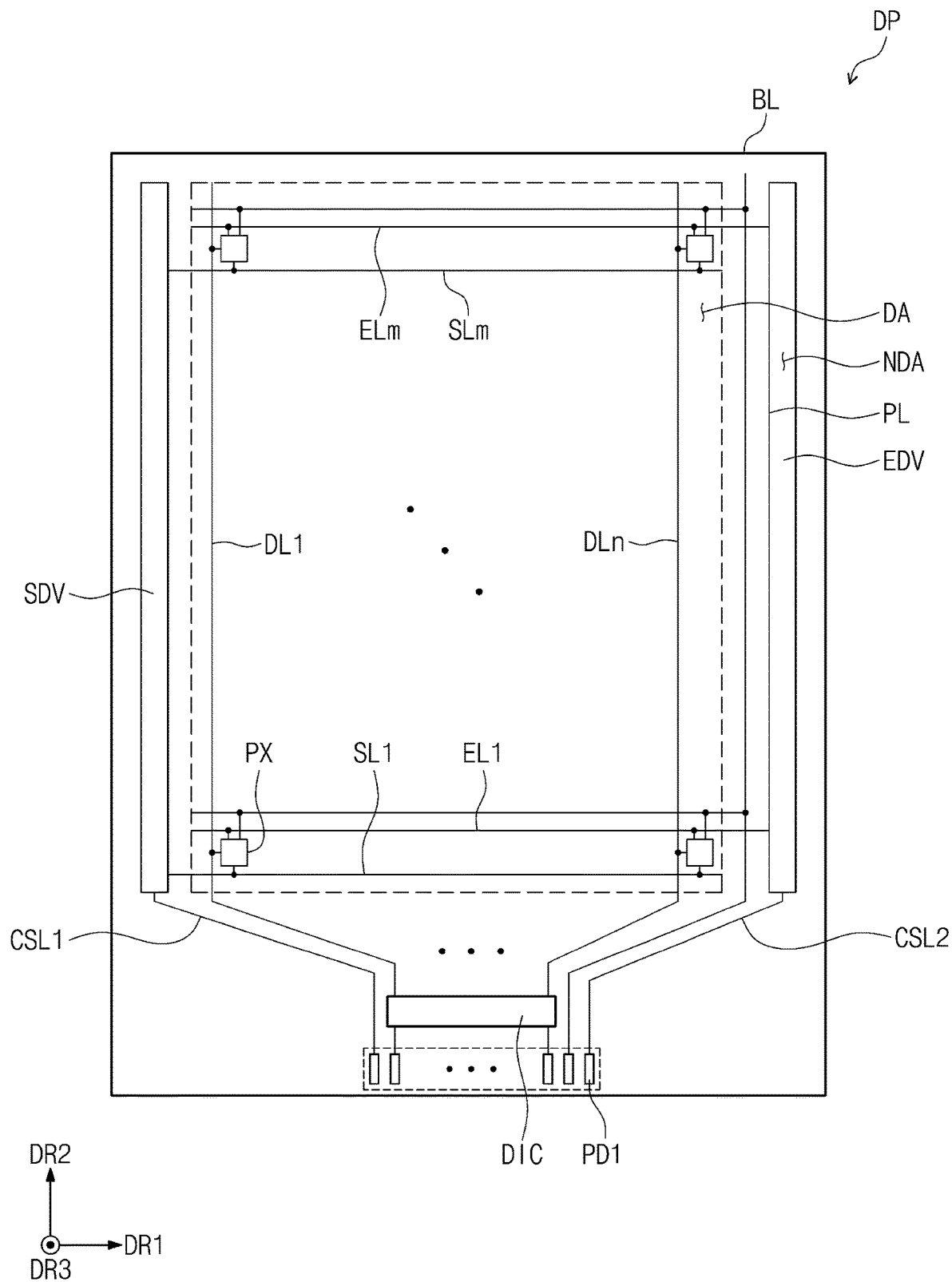
FIG. 5 is a plan view of a display panel according to an embodiment of the inventive concept.

FIG. 5 is a plan view of the display panel DP according to an embodiment of the inventive concept.

Referring to FIG. 5, the display panel DP may include a base layer BL, pixels PX, signal lines SL1 to SLm, DL1 to DLn, EL1 to ELm, CSL1, CSL2, PL electrically connected to the pixels PX, a scan driver SDV, a data driver DIC, an emission driver EDV, and pads PD1.

The base layer BL may provide a base surface with elements and lines of the display panels DP disposed thereon. The base layer BL may include a display area DA and a non-display area NDA. The display area DA may be an area in which the pixels PX are arranged. The non-display area NDA may be an area disposed adjacent to the display area DA and without an image displayed. In the non-display area NDA, elements and lines configured to drive the pixels PX may be disposed. The display area DA may correspond to the active area AA (see FIG. 2) of the display device DD, and the non-display area NDA may correspond to the non-active area NAA (see FIG. 2) of the display device DD.

The pixels PX may each include a pixel driving circuit composed of transistors (e.g., a switching transistor, a driving transistor, etc.) and a capacitor, and a light emitting element electrically connected to the pixel driving circuit. The pixels PX may each emit light in response to an electrical signal applied thereto.

The scan driver SDV, the data driver DIC, and the emission driver EDV may each be disposed in the non-display area NDA. However, the embodiment is not necessarily limited thereto, and the scan driver SDV, the data driver DIC, and/or the emission driver EDV may be disposed in the display area DA, whereby the area of the non-display area NDA may be reduced.

The signal lines SL1 to SLm, DL1 to DLn, EL1 to ELm, CSL1, CSL2, PL may include scan lines SL1 to SLm, data lines DL1 to DLn, emission lines EL1 to ELm, first and second controls lines CSL1 and CSL2, and a power line CSL2. Here, m and n each are integers of 1 or greater. The pixels PX may be electrically connected to a corresponding scan line, data line, and emission line among the scan lines SL1 to SLm, the data lines DL1 to DLn, and the emission lines EL1 to ELm. The electronic device DP may include more types of signal lines according to the configuration of the pixel driving circuit of the pixels PX.

The scan lines SL1 to SLm may extend in the first direction DR1 to be electrically connected to the scan driver SDV. The data lines DL1 to DLn may extend in the second direction DR2 to be electrically connected to the data driver DIC. The emission lines EL1 to ELm may extend in the first direction DR1 to be electrically connected to the emission driving unit EDV.

The power line PL may include a portion extending in the first direction DR1 and a portion extending in the second direction DR2. The portion extending in the first direction DR1 and the portion extending in the second direction DR2 may be disposed on different layers and connected through a contact hole. However, the embodiment is not necessarily limited thereto, and the portion extending in the first direction DR1 and the portion extending in the second direction DR2 of the power line PL may have an integral shape on the same layer.

The portion extending in the first direction DR1 of the power line PL may extend to the display area DA to be electrically connected to the pixels PX, and the portion extending in the second direction DR2 may be disposed in the non-display area NDA to extend towards the pads PD1. The power line PL may receive a power supply voltage to provide the power supply voltage to the pixels PX.

The first control line CSL1 may be electrically connected to the scan driver SDV. The second control line CSL2 may be electrically connected to the emission driver EDV.

The pads PD1 may be disposed adjacent to the lower end of the non-display area NDA. The pads PD1 may be disposed more adjacent to the lower end of the display panel DP than the data driver DIC. The pads PD1 may be spaced apart from each other along the first direction DR1. The pads PD1 may be a portion electrically connected to a circuit board configured to provide signals for controlling the operations of the scan driver SDV, the data driver DIC, and the emission driver EDV.

The pads PD1 may each be connected to corresponding signal lines of the signal lines SL1 to SLm, EL1 to ELm, DL1 to DLn, CSL1, CSL2, PL. For example, the power line PL, the first and second control line CSL1, CSL2, the data lines DL1 to DLn may each be electrically connected to the corresponding pad PD1. The data lines DL1 to DLn may each be electrically connected to the corresponding pad PD1 through the data driver DIC.

The scan driver SDV may generate a plurality of scan signals in response to the scan control signal. The scan signals may be applied to the pixels PX through the scan lines SL1 to SLm. The data driver DIC may generate data voltages corresponding to the image signals in response to the data control signal. The data voltages may be applied to the pixels through the data lines DL1 to DLn. The emission driver EDV may generate emission signals in response to the emission control signal. The light emission signals may be applied to the pixels PX through the light emission lines EL1 to ELm.

The pixels PX may receive data voltages in response to the scan signals. The pixels PX may display an image by emitting light of the brightness corresponding to the data voltages in response to the emission signals. An emission time of the pixels PX may be controlled by the emission signals. Therefore, the display panel DP may generate the image on the display area DA through the pixels PX.

Figure 6A:
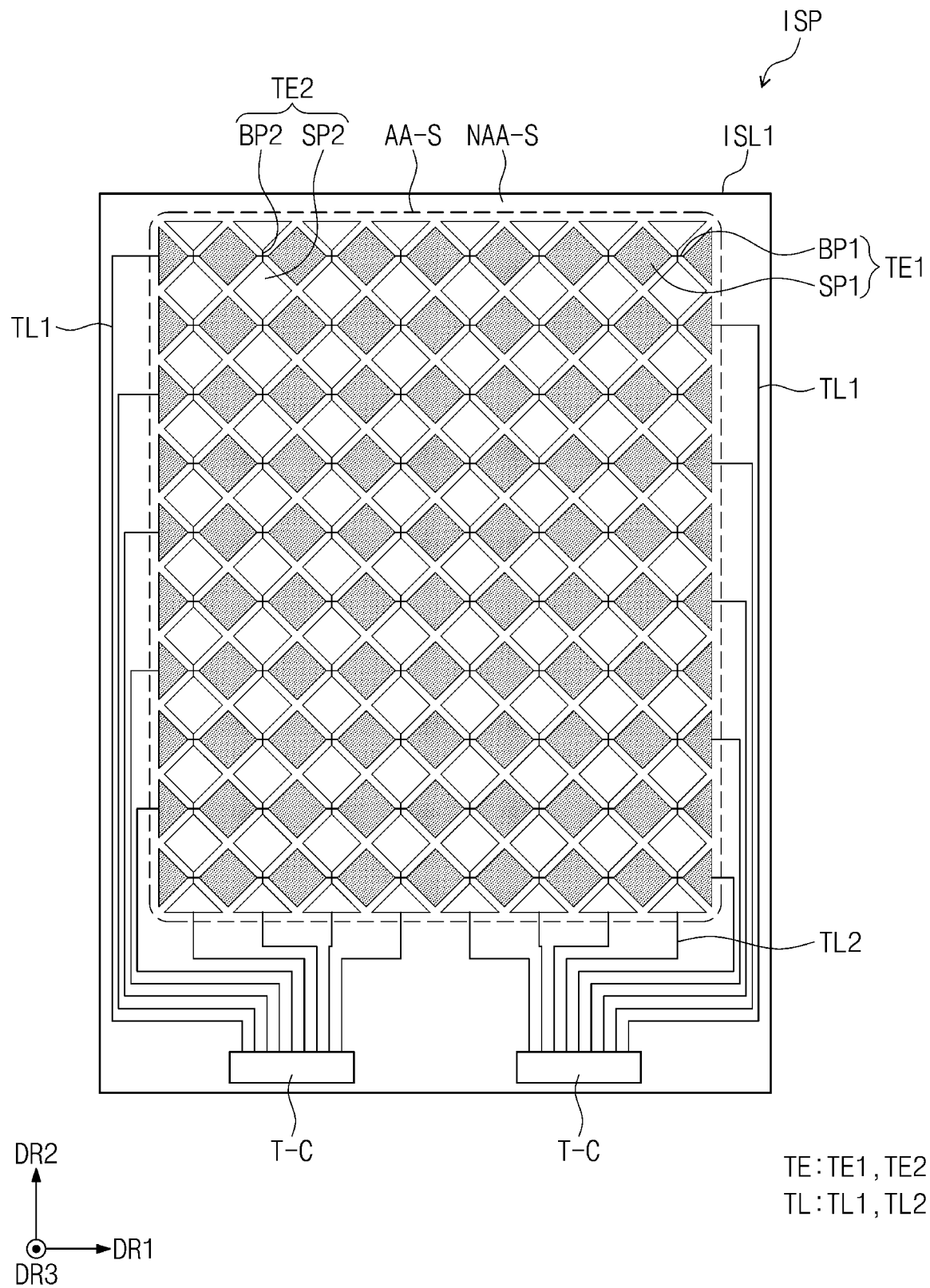
FIGS. 6A and 6B are plan views of an input sensor according to an embodiment of the inventive concept.
Figure 6B:
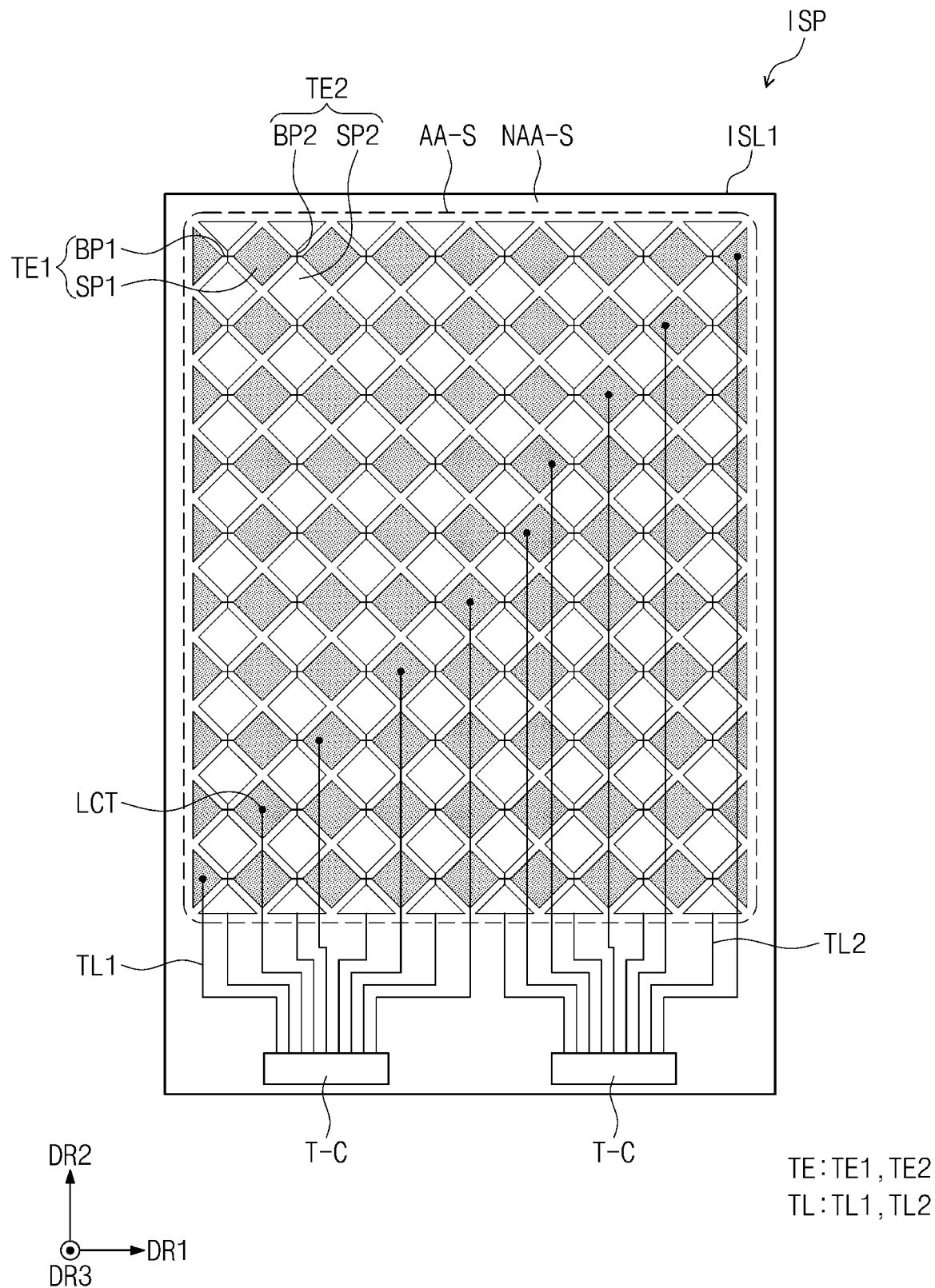

FIGS. 6A and 6B are plan views of the input sensor ISP according to an embodiment of the inventive concept.

Referring to FIGS. 6A and 6B, the input sensor ISP may include a sensing area AA-S and a non-sensing area NAA-S adjacent to the sensing area AA-S. The sensing area AA-S may correspond to the active AA (see FIG. 2) of the display device DD (see FIG. 2). The sensing area AA-S may be an area in which the sensing electrodes TE of the input sensor ISP may sense the external input TC (see FIG. 1). The non-sensing area NAA-S may correspond to the non-active NAA (see FIG. 2) of the display device DD (see FIG. 2). The non-sensing area NAA-S may be an area in which elements or lines for driving the sensing electrodes TE disposed in the sensing area AA-S are disposed.

The input sensor ISP may include the sensing electrode TE, trace lines TL, and a sensing control unit T-C that are disposed on the sensing base layer ISL1.

The sensing electrodes TE may include first sensing electrodes TE1 and second sensing electrodes TE2 that cross each other and are electrically insulated from each other in a plan view. The input sensor ISP may acquire information about an external input through mutual capacitance variation between the first sensing electrodes TE1 and the second sensing electrodes TE2.

The first sensing electrodes TE1 may each extend along the first direction DR1 and be arranged along the second direction DR2. The first sensing electrodes TE1 may be arranged as a plurality of rows in the second direction DR2. FIGS. 6A and 6B illustrates 10 example first sensing electrodes TE1, but the number of the first sensing electrodes TE1 included in the input sensor ISP is not necessarily limited thereto.

The second sensing electrodes TE2 may each extend along the first direction DR2 and be arranged along the first direction DR1. The second sensing electrodes TE2 may be arranged as a plurality of columns in the first direction DR1. FIGS. 6A and 6B illustrate 8 example second sensing electrodes TE2, but the number of the second sensing electrode TE2 included in the input sensor ISP is not necessarily limited thereto.

The first sensing electrodes TE1 may each include a first sensing pattern SP1 and a first connection pattern BP1. The first sensing patterns SP1 may be arranged in the first direction DR1. The first connection patterns BP1 may connect the adjacent first sensing patterns SP1 in the first direction DR1. The first connection patterns BP1 may be disposed on the same layer as the first sensing patterns SP1, and extend from the first sensing patterns SP1 to have an integral shape in a plan view. The first sensing patterns SP1 and the first connection patterns BP1 may be patterned from the same conductive layer through the same processes. However, provided that the first connection patterns BP1 electrically connect the adjacent sensing patterns SP1 in the first direction DR1, the embodiment is not necessarily limited thereto.

The second sensing electrodes TE2 may each include a second sensing pattern SP2 and a second connection pattern BP2. The second sensing patterns SP2 may be arranged in the second direction DR2. The second connection patterns BP2 may connect the adjacent second sensing patterns SP2 in the second direction DR2. The second connection patterns BP2 may be disposed on a different layer from the second sensing patterns SP2 to be connected to the corresponding second sensing patterns SP2 through contact holes. The second sensing patterns SP2 spaced apart from each other in the second direction DR2 may be electrically connected through the second connection patterns BP2. The second connection patterns BP2, which are disposed on a different layer from the second sensing patterns SP2 to electrically connect the second sensing patterns SP2, may be defined as bridge patterns.

In an embodiment, the first sensing patterns SP1, the first connection patterns BP1, and the second sensing patterns SP2 may be connected on the same layer. The second connection electrode BP2 may be disposed on a different layer from the second sensing patterns SP2. For example, the first sensing patterns SP1, the first connection patterns BP1, and the second sensing patterns SP2 may be included in the second sensor conductive layer MTL2 (see FIG. 4C), and the second connection patterns BP2 may be included in the first sensor conductive layer MTL1 (see FIG. 4C). However, the embodiment is not necessarily limited thereto, and the first sensing patterns SP1, the first connection patterns BP1, and the second sensing patterns SP2 may be included in the first sensor conductive layer MTL1 (see FIG. 4C), and the second connection patterns BP2 may be included in the second sensor conductive layer MTL2 (see FIG. 4C). Alternatively, in an embodiment, the first sensing patterns SP1, the second sensing patterns SP2, and the second connection patterns BP2 may be disposed on the same layer, and the first connection patterns BP1 may be disposed on a different layer from the first sensing patterns SP1.

The trace lines TL may include the first trace lines TL1 and the second trace lines TL2. The first trace lines TL1 may be respectively connected to the first sensing electrodes TE1. The first trace lines TL1 may each be connected to the first sensing electrode TE1 in the corresponding row of the plurality of first sensing electrode rows TE1. The second trace lines TL2 may be respectively connected to the second sensing electrodes TE2. The second trace lines TL2 may each be connected to the second sensing electrode TE2 in the corresponding column of the plurality of second sensing electrode columns.

The second trace lines TL2 may be respectively connected to lower ends of the second sensing electrodes TE2 adjacent to the sensing control unit T-C. The second trace lines TL2 may each extend from the lower end of the corresponding second sensing electrodes TE2 in the non-sensing area NAA-S to be connected to the sensing control unit T-C.

As shown in FIG. 6A, the first trace lines TL1 may be respectively connected to the left end or the right end of the first sensing electrodes TE1. For example, the first trace lines TL1 respectively connected to the first sensing electrodes TE1 in odd rows of the first trace lines TL1 may be connected to the left end of the corresponding first sensing electrode TE1 of the first odd row sensing electrodes TE1. The first trace lines TL1 respectively connected to the first sensing electrodes TE1 in even rows of the first trace lines TL1 may be connected to the right end of the corresponding first sensing electrode TE1 of the first even row sensing electrodes TE1. The first trace lines TL1 may each extend from the left end or the right end of the corresponding second sensing electrode TE1 in the non-sensing area NAA-S to be connected to the sensing control unit T-C.

As shown in FIG. 6B, the first trace lines TL1 may extend within the sensing area AA-S in the second direction DR2. The first trace lines TL1 may each be connected to the corresponding first sensing electrode TE1 in the sensing area AA-S. For example, the first trace lines TL1 may each overlap the first sensing pattern SP1 of the corresponding first sensing electrode TE1, and be connected to the first sensing pattern SP1 through the contact part LCT disposed in the sensing area AA-S. The first trace lines TL1 may each extend from the contact part LCT in the sensing area AA-S to be connected to the sensing control unit.

As the first trace lines TL1 each are connected to the corresponding sensing electrode TE1 in the sensing area AA-S and overlap the second area AA-S, the first trace lines TL1 might not be disposed in areas adjacent to the left and right of the non-sensing area NAA-S. Accordingly, the area of the non-sensing area NAA-S may be more reduced than that in the embodiment shown in FIG. 6A. As the result, the area occupied by the bezel area BZA (see FIG. 1) may be reduced in the display surface IS (see FIG. 1) of the electronic device ELD (see FIG. 1), and thus a narrow bezel may be implemented.

FIG. 6B illustrates example one-to-one connections between the first trace lines TL1 and the first sensing electrodes TE1 through the corresponding contact parts LCT, but the embodiment is not necessarily limited thereto. Two or more first trace lines TL1 may be respectively connected to the first sensing electrodes TE1 according to the area of the sensing area AA-S, the arrangement of the first sensing electrodes TE1 or the like.

The first trace lines TL1 may be disposed on a different layer from at least a portion of the second sensing patterns TE2. For example, the first connection lines TL1 may be disposed on a different layer from the second sensing patterns SP2. In an embodiment, the first trace lines TL1 may be included in the first sensor conductive layer MTL1 (see FIG. 4C), and the second sensing patterns SP2 may be included in the second sensor conductive layer MTL2 (see FIG. 4C). However, the embodiment of the inventive concept is not necessarily limited thereto.

The sensing control unit T-C may be disposed in the non-sensing area NAA-S. The sensing control unit T-C may be disposed adjacent to the lower end of the sensor base layer ISL1. The sensing control unit T-C may be electrically connected to the trace lines TL. The sensing control unit T-C may apply signals to the sensing electrodes TE or receive signals from the sensing electrodes TE through the trace lines TL. The sensing control unit T-C may include a controller, and generate the coordinate values of the position to which an external input is input on the basis of the signals received from the sensing electrodes TE. However, the embodiment is not necessarily limited thereto, and the sensing control unit T-C may include sensing pads that are spaced apart from each other, are respectively connected to the trace lines TL, and are electrically connected to the circuit board configured to provide driving signals.

In an embodiment, the driving signals for driving the first sensing electrodes TE1 and the second sensing electrodes TE2 may be applied from the sensing control unit T-C to the first sensing electrodes TE1 and the second sensing electrodes TE2 through the second trace lines TL2. Signals including information sensed in the first sensing electrodes TEL and the second sensing electrodes TE2 may be output through the first trace lines TL1. However, the embodiment is not necessarily limited thereto.

Figure 7A:
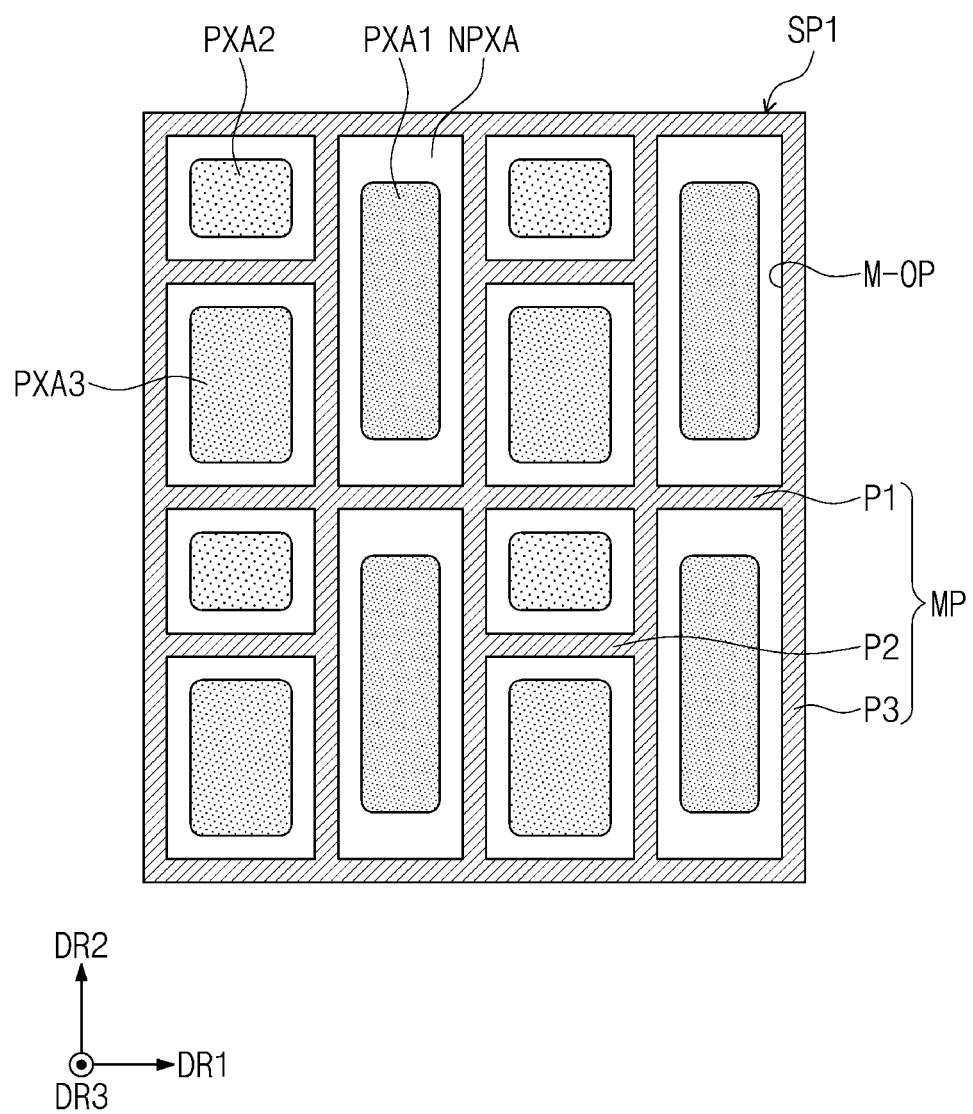
FIGS. 7A and 7B are enlarged plan views of a sensing pattern according to an embodiment of the inventive concept.
Figure 7B:
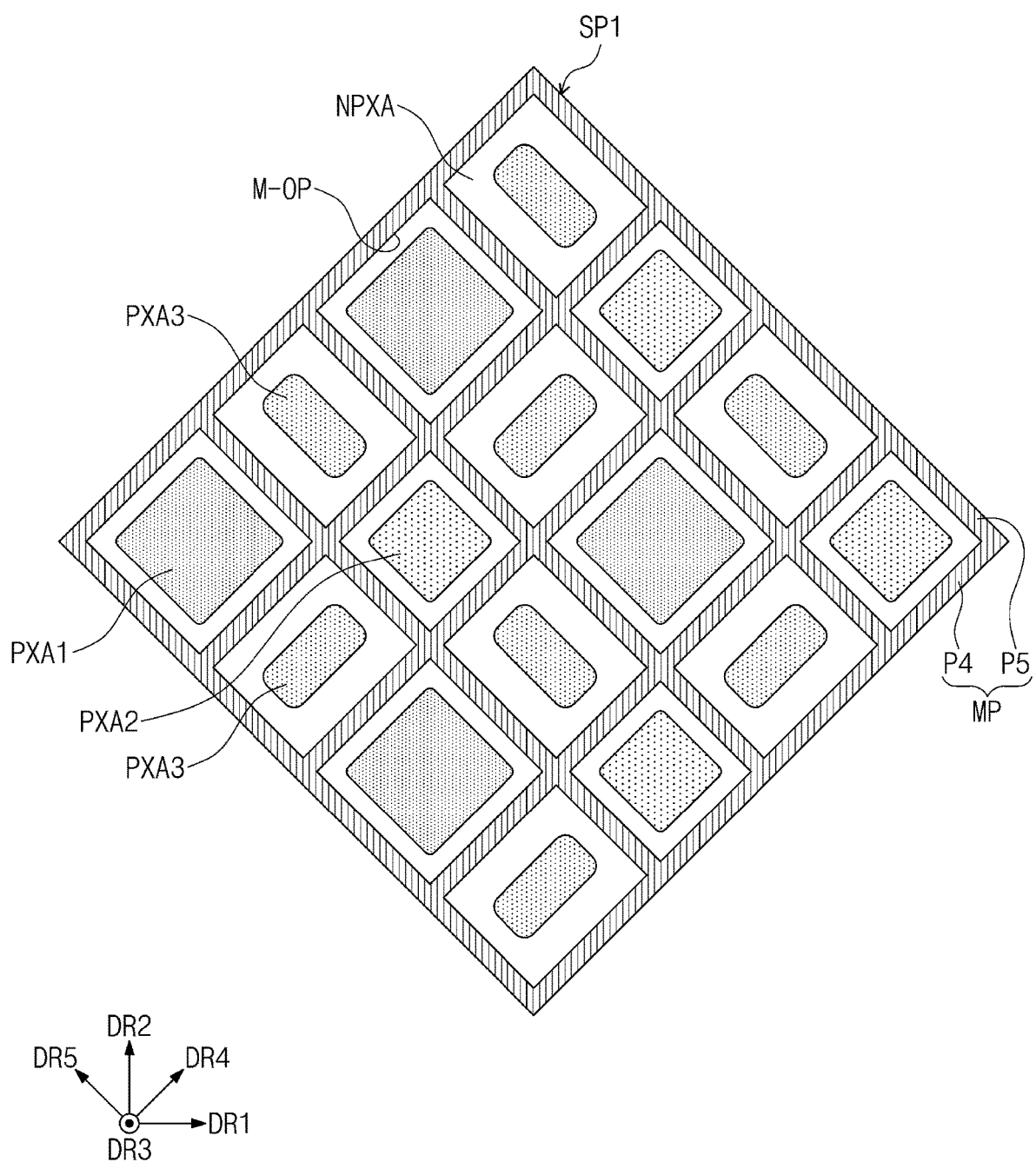

FIGS. 7A and 7B are enlarged plan views of the sensing pattern SP1 according to an embodiment of the inventive concept. FIGS. 7A and 7B illustrate an example enlarged portion of the first sensing pattern SP1, but the description of this may be also applied to the second sensing pattern SP2 (see FIGS. 6A and 6B). Hereinafter, the description will be provided by referring to the first sensing pattern SP1 as a sensing pattern SP1.

The display panel DP (see FIG. 2) may include emission areas PXA1, PXA2, PXA3 and a non-emission area NPXA at least partially surrounding the emission area PXA1, PXA2, PXA3. FIGS. 7A and 7B illustrate the emission areas PXA1, PXA2, PXA3 and the non-emission area NPXA that overlap the sensing pattern SP1.

The emission areas PXA1, PXA2, PXA3 may include a first emission area PXA1, a second emission area PXA2, and a third emission area PXA3. The first to third emission areas PXA1, PXA2 and PXA3 may be divided according to colors of light beams output through the emission areas. A first color light beam may be output from the first emission area PXA1, a second color light beam may be output from the second emission area PXA1, a third color light beam may be output from the third emission area PXA1, and the first to third color light beams may have different colors from each other. For example, the first color light may be blue light, the second color light may be red light, and the third color light may be green light. However, the embodiment of the inventive concept is not necessarily limited thereto.

The non-emission area NPXA may at least partially surround the first to third emission areas PXA1, PXA2, and PXA3. The non-emission area NPXA may set the boundaries of the first to third emission areas PXA1, PXA2, and PXA3. Through this, the non-emission area NPXA may prevent mixture of the colors of the light beams output from the first to third emission areas PXA1, PXA2, and PXA3.

The areas of the first to third emission areas PXA1, PXA2, and PXA3 may be designed in various ways according to the color of the output light and the resolution of the display panel DP (see FIG. 2). The areas of the first to third emission areas PXA1, PXA2, and PXA3 may be different from each other. For example, the area of the first emission area PXA1 may the largest of those of the first to third emission areas PXA1, PXA2, and PXA3.

The first to third emission areas PXA1, PXA2, and PXA3 may each have, in a plan view, various shapes such as a polygon, a circle, or an ellipse. Here, the polygonal shape may include a polygon in a mathematical sense and a polygon with curve-defined vertices. The shapes of the first to third emission areas PXA1, PXA2, and PXA3 may correspond to the shape of an emission opening PX-OP (see FIG. 8A) provided in a pixel definition layer PDL (see FIG. 8A), and the shapes of the vertices may change according to the etching performance of the pixel definition layer PDL.

The first sensing electrodes TE1 (see FIGS. 6A and 6B) and the second sensing electrodes TE2 (see FIGS. 6A and 6B) may include a mesh pattern MP in which mesh openings M-OP are defined. The mesh openings M-OP may overlap the first to third emission areas PXA1, PXA2, and PXA3. The mesh pattern MP might not overlap the first to third emission areas PXA1, PXA2, and PXA3, but may overlap the non-emission area NPXA. Accordingly, the efficiency of the light beams output from the first to third emission areas PXA1, PXA2, and PXA3 of the display panel DP might not be reduced.

When the first sensing electrodes TE1 (see FIGS. 6A and 6B) includes the mesh pattern MP, a parasitic capacitance between the first sensing electrodes TEL and the second electrode CE (see FIG. 8A) of the display panel DP (see FIG. 8A) may be more reduced than that in case of the first sensing electrodes TE1 without the mesh openings M-OP. When the second sensing electrode TE2 (see FIGS. 6A and 6B) includes the mesh pattern MP, a parasitic capacitance between the second sensing electrodes TE2 and the second electrode CE (see FIG. 8A) of the display panel DP (see FIG. 8A) may be more reduced than that in case of the second sensing electrodes TE2 without the mesh openings M-OP. As a result, the touch sensitivity of the input sensor ISP (see FIGS. 6A and 6B) may be increased.

The first emission areas PXA1, the second emission area PXA2, and the third emission PXA3 may each be provided in plural to have a prescribed arrangement in a plan view. The arrangement and the areas of the mesh openings M-OP may change in various ways according to the arrangement and the areas of the first to third emission areas PXA1, PXA2, and PXA3. Accordingly, the shape of the mesh pattern MP may be diversified according to the arrangement and the areas of the first to third emission areas PXA1, PXA2, and PXA3.

Referring to FIG. 7A, the first to third emission areas PXA1, PXA2, and PXA3 may each extend in the second direction DR2. The first emission area PXA1 and the third emission area PXA3 may each include long sides extending in the second direction DR2. The length of the first emission area PXA1 in the second direction DR2 may be longer than that of the third emission area PXA3. The second emission area PXA2 may include a pair of long sides extending in the first direction DR1. The length of the second emission area PXA2 in the second direction DR2 may be shorter than that of each of the first emission area PXA1 and third emission area PXA3.

The first to third emission areas PXA1, PXA2, and PXA3 may each be provided in plural. The first emission areas PXA1 may be arranged in the second direction DR2 to provide a first column, and the second emission areas PXA2 and third emission areas PXA3 may be alternately arranged in the second direction DR2 to provide a second column. The first and second columns may be alternately arranged in the first direction DR1. The first emission areas PXA1 in the first direction DR1 may respectively overlap at least portions of the second and third emission areas PXA2, PXA3.

The mesh pattern MP may include a first line part P1, a second line part P2, and a third line part P3. The first to third line parts P1, P2, P3 may have an integral shape (such as being a single unitary structure). The first to third line parts P1, P2, P3 may be connected to each other to define the mesh openings M-OP that overlap the first to third emission areas PXA1, PXA2, PXA3. The first to third line parts P1, P2, P3 may be portions provided by patterning the mesh openings M-OP on the integral conductive layer. The first to third line parts P1, P2, P3 may be disposed on the non-emission area NPXA to at least partially surround the first to third emission areas PXA1, PXA2, PXA3.

The first extension part P1 and the second extension part P2 may correspond to a portion of the mesh pattern MP, which extends in the first direction DR1. The first line part P1 may be disposed between the first emission areas PXA1 and between the second emission area PXA2 and the third emission area PXA3 that face each other in the second direction DR2. The second line part P2 may overlap the first emission area PXA1 in the first direction DR1, and be disposed between the second emission area PXA2 and the third emission area PXA3 that are adjacent to each other in the second direction DR2.

The third line part P3 may correspond to a portion the mesh pattern MP, which extends in the second direction DR2. The third line part P3 may extend from the first line part P1 in the second direction DR2. The third line part P3 may be disposed, in the first direction DR1, between first emission area PXA1 and the second emission area PXA2 that are adjacent to each other and between the first emission area PXA1 and the third emission area PXA3 that are adjacent to each other.

Referring to FIG. 7B, the first emission area PXA1 and the second emission areas PXA2 may each have a substantially diamond shape in a plan view. The third emission area PXA3 may include two kinds of third emission areas PXA3 having different extension directions of the long sides. For example, the third emission area PXA3 may include a pair of long sides extending in a fourth direction DR4 or a fifth direction DR5.

In the embodiment, the fourth direction DR4 may be a direction intersecting with each of the first direction DR1 and the second direction DR2 on a plane defined by the first direction DR1 and the second direction DR2. The fifth direction DR5 may be a direction intersecting with each of the first direction DR1, the second direction DR2, and the fourth direction DR4 on a plane defined by the first direction DR1 and the second direction DR2.

The first to third emission areas PXA1, PXA2, and PXA3 may each be provided in plural. The first emission area PXA1 and the second emission area PXA2 may be alternately arranged in the first direction DR1 and the second direction DR2. In the fourth direction DR4, the first emission areas PXA1 and the third emission areas PXA3 extending in the fifth direction DR5 may be alternately arranged, and in the fifth direction DR5, the first emission areas PXA1 and the third emission areas PXA3 extending in the fourth direction DR4 may be alternately arranged. In the fourth direction DR4, the second emission areas PXA2 and the third emission areas PXA3 extending in the fourth direction DR5 may be alternately arranged, and in the fifth direction DR5, the second emission areas PXA2 and the third emission areas PXA3 extending in the fifth direction DR4 may be alternately arranged.

The mesh pattern MP may include a fourth line part and a fifth line part P5. The fourth P4 and the fifth line part P5 may have an integral shape connected to each other, and define the mesh openings M-OP overlapping the first to third emission areas PXA1, PXA2, PXA3. The fourth line part P4 and the fifth line part P5 may be portions provided by patterning the mesh openings M-OP on the integral conductive layer. The fourth line part P4 and the fifth line part P5 may be disposed on the non-emission area NPXA to at least partially surround the first to third emission areas PXA1, PXA2, PXA3.

The fourth line part P4 may correspond to a portion of the mesh pattern MP, which extends in the fourth direction DR4. The fifth line part P5 may correspond to a portion of the mesh pattern MP, which extends in the fifth direction DR5. The fourth line part P4 and the fifth line part P5 may intersect with each other in a plan view.

The example arrangement and shapes of the emission areas PXA1, PXA2, PXA3 and the example shape of the mesh pattern MP shown in FIGS. 7A and 7B are illustrative, and the embodiment is not necessarily limited thereto.

Figure 8A:
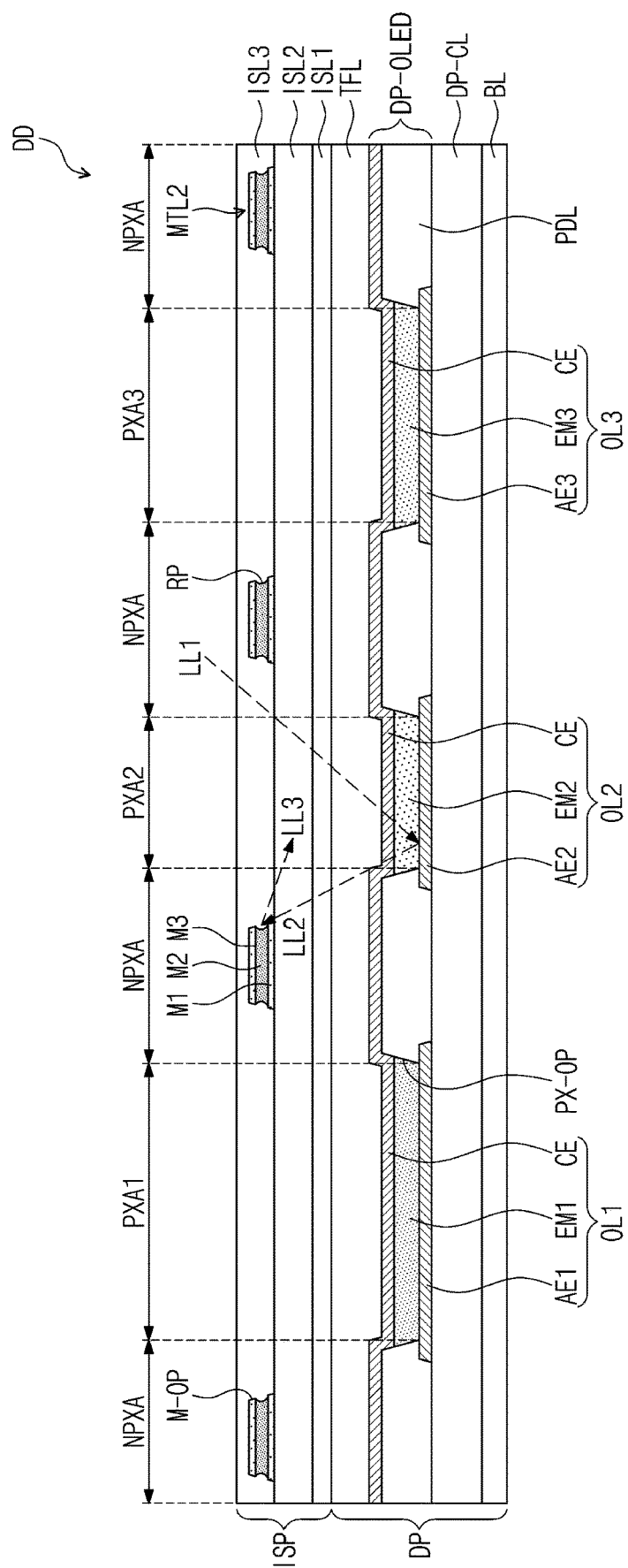
FIGS. 8A and 8B are cross-sectional views of a display device according to an embodiment of the inventive concept.
Figure 8B:
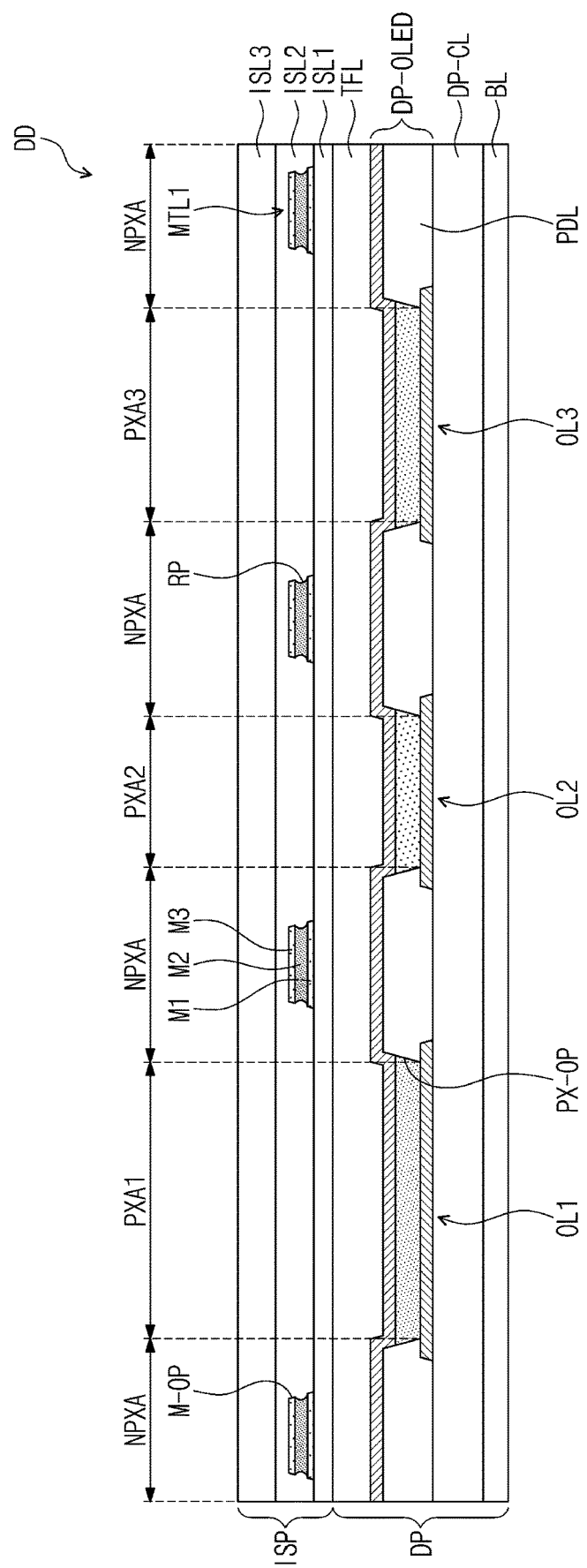
Figure 8C:
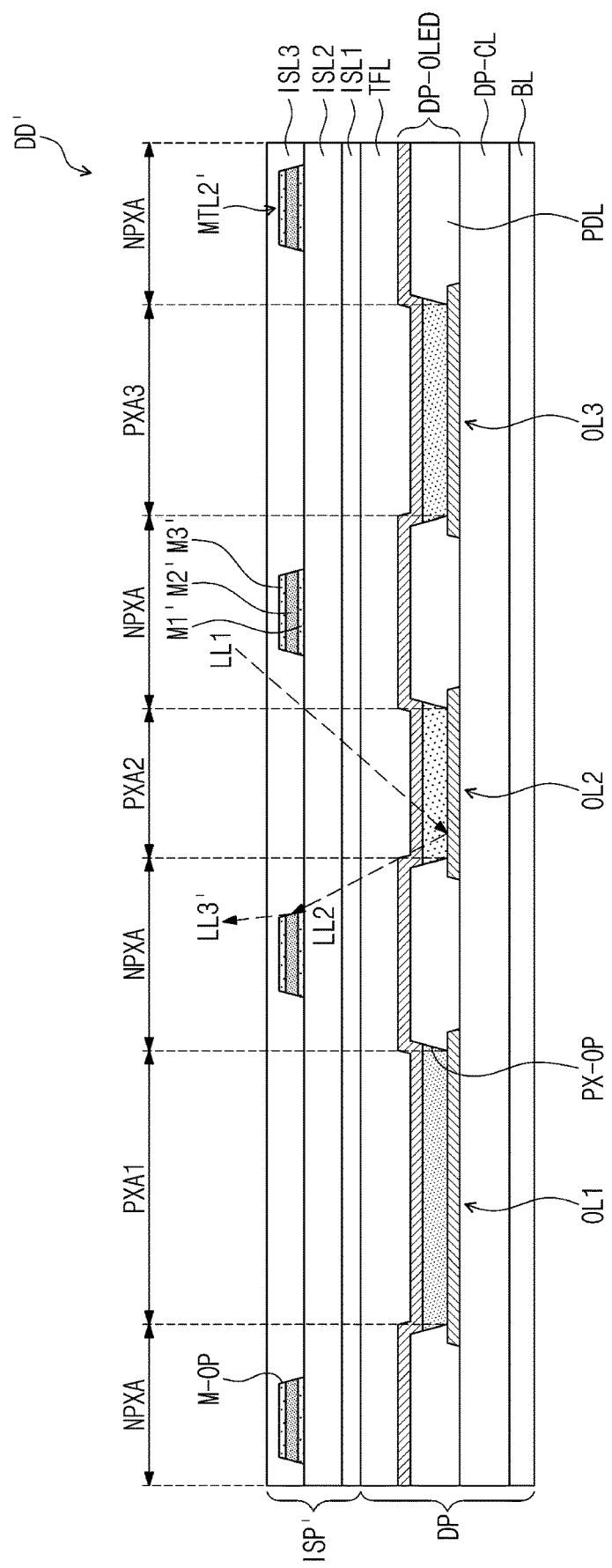
FIG. 8C is a cross-sectional view according to a comparative embodiment of the inventive concept.

FIGS. 8A and 8B are cross-sectional views of the display device DD according to an embodiment of the inventive concept. FIG. 8C is a cross-sectional view of a display device DD' according to a comparative embodiment of the inventive concept.

Referring to FIGS. 8A and 8B, the display panel DP may include a base layer BL, a circuit element layer DP-CL, a display element layer DP-OLED, and an encapsulation layer TFL. For the description of each component of the display panel DP, the above description may be applied.

The display element layer DP-OLED may include light emitting elements OL1, OL2, OL3 and a pixel definition layer PDL. The light emitting elements OL1, OL2, OL3 may include first to third light emitting elements OL1, OL2, OL3 respectively corresponding to the first to third emission areas PXA1, PXA2, PXA3.

The first to third emission areas PXA1, PXA2, PXA3 may each be an organic light emitting element, an inorganic light emitting element, a quantum dot light emitting element, a micro LED, a nano LED, an electrophoretic element, an electrowetting element or the like. However, the embodiment of the light emitting element is not necessarily limited to any one particular arrangement, provided that light may be generated or light quantity may be controlled.

The first to third light emitting elements OL1, OL2, OL3 may include respective first electrodes AE1, AE2, AE3, respective light emitting layers EM1, EM2, EM3, and a second electrode CE.

The first electrodes AE1, AE2, AE3 of the first to third light emitting elements OL1, OL2, OL3 may be spaced apart from each other on the circuit element layer DP-CL. The respective first electrodes AE1, AE2, AE3 of the first to third light emitting elements OL1, OL2, OL3 may be electrically connected to corresponding driving elements of the circuit element layer CP-CL.

The first electrodes AE1, AE2, AE3 may each be a semi-transparent electrode, or a reflective electrode. For example, the first electrodes AE1, AE2, AE3 may each include a reflective layer composed of silver, magnesium, aluminum, platinum, gold, nickel, neodymium, iridium, chrome, or a compound thereof, and a transparent or semi-transparent electrode layer disposed on the reflective layer. The transparent or semi-transparent electrode layer may include zinc oxide, indium oxide, indium tin oxide, indium zinc oxide, indium gallium zinc oxide, or zinc oxide doped with aluminum.

The pixel definition layer PDL may be defined with the emission openings PX-OP provided by penetrating through the pixel definition layer PDL. The emission openings PX-OP may respectively expose at least portions of the first electrodes AE1, AE2, AE3 of the first to third light emitting elements OL1, OL2, OL3. Areas of the first electrodes AE1, AE2, AE3 exposed by the emission openings PX-OP from the pixel definition layer PDL may correspond to the emission areas PXA1, PXA2, PXA3. An area in which the pixel definition layer PDL is disposed may correspond to the non-emission area NPXA.

In an embodiment, the pixel definition layer PDL may have the light absorption property. For example, the pixel definition layer PDL may have a black color and include a black coloring agent. The black coloring agent may include a black dye or a black pigment. The black coloring agent may include carbon black, a metal such as chromium, or an oxide thereof. However, the embodiment of the pixel definition layer PDL is not necessarily limited thereto.

The light emitting layers EM1, EM2, EM3 of the first to third light emitting elements OL1, OL2, OL3 may be disposed on the corresponding first electrodes AE1, AE2, AE3. The light emitting layers EM1, EM2, EM3 of the first to third light emitting elements OL1, OL2, OL3 may be respectively disposed in the emission openings PX-OP. The light emitting layers EM1, EM2, EM3 may emit light of blue, red, and/or green colors. However, the embodiment is not necessarily limited thereto, the light emitting layers EM1, EM2, EM3 of the first to third light emitting elements OL1, OL2, OL3 may be provided as an integral common layer to emit source light such as blue color light or white light.

The second electrode CE of the first to third light emitting elements OL1, OL2, OL3 may be disposed on the light emitting layers EM1, EM2, EM3. The second electrode CE of the first to third light emitting elements OL1, OL2, OL3 may be provided as an integral common layer intersecting with the emission areas PXA1, PXA2, PXA3 and the non-emission area NPXA. For example, the second electrode CE of the first to third light emitting elements OL1, OL2, OL3 may be a common electrode and to which a common voltage may be applied.

The encapsulation layer TFL may be disposed on the first to third light emitting elements OL1, OL2, OL3. The encapsulation layer TFL may encapsulate and protect the first to third light emitting elements OL1, OL2, OL3.

The encapsulation layer TFL may include an inorganic film and/or an organic film. For example, the encapsulation layer TFL may include inorganic films and an organic film disposed between the inorganic films. The inorganic films of the encapsulation layer TFL may protect the first to third light emitting elements OL1, OL2, OL3 from moisture/oxygen. The organic film of the encapsulation layer TFL may protect the first to third light emitting elements OL1, OL2, OL3 from foreign matters such as dust particles.

Referring to FIG. 8A, the input sensor ISP may include a sensor base layer ISL1, a first sensor insulation layer ISL2, a second sensor insulation layer ISL3, and a second sensor conductive layer MTL2. For the description of each component of the display panel ISP, the above description may be applied.

The second sensor conductive layer MTL2 may include the first sensing electrodes TE1 (see FIGS. 6A and 6B) and the second sensing patterns SP2 (see FIGS. 6A and 6B). The second sensor conductive layer MTL2 may have the shape of the aforementioned mesh pattern MP (see FIGS. 7A and 7B), and be disposed in the non-emission area NPXA.

The second sensor conductive layer MTL2 may include a plurality of conductive layers M1, M2, M3. The plurality of conductive layers M1, M2, M3 may include first to third conductive layers M1, M2, M3. In an embodiment, the first conductive layer M1 may include a different material from the second conductive layer M2, and the first conductive layer M1 may include the same material as the third conductive layer M3. However the embodiment is not necessarily limited thereto.

The first conductive layer M1 and the third conductive layer M3 may each include an anti-corrosion metal material. The first conductive layer M1 and the third conductive layer M3 may be respectively disposed on the top surface and the bottom surface of the second conductive layer M2 to protect the second conductive layer M2 from a scratch occurring in processes. In addition, the first conductive layer M1 and the third conductive layer M3 may prevent corrosion of the second conductive layer M2 caused by moisture permeation. For example, the first conductive layer M1 and the third conductive layer M3 may each include molybdenum, titanium, or an alloy thereof. However, the material of the first conductive layer M1 and the third conductive layer M3 are not necessarily limited thereto.

The second conductive layer M2 may be disposed between the first conductive layer M1 and the third conductive layer M3. The second conductive layer M2 may include a low resistance metal material. For example, the second conductive layer M2 may include gold, silver, copper, aluminum, platinum, or an alloy thereof. However, the material of the second conductive material M2 is not necessarily limited thereto.

The second conductive layer M2 may have a larger thickness than each of the first conductive layer M1 and the third conductive layer M3. As the second sensor conductive layer M2 including a relatively low resistance material may have a large thickness, the resistances of the first sensing electrodes TE1 (see FIGS. 6A and 6B) and the second sensing electrodes TE2 (see FIGS. 6A and 6B) may become reduced.

The second sensor conductive layer MTL2 may have sides with recesses RP defined therein. The recesses RP may be defined in the sides of the second sensor conductive layer MTL2, which define the mesh opening M-OP. For example, the second sensor conductive layer MTL2 may include the first sensing pattern SP1, the first connection pattern BP1, and the second sensing pattern SP2 shown in FIGS. 6A and 6B, and have the recesses RP defined in the sides of the first sensing pattern SP1, the first connection pattern BP1, and the second sensing pattern SP2.

The recesses RP may be provided such that the sides of the second conductive layer M2 of the second sensor conductive layer MTL2 are recessed inward. The sides of the second conductive layer M2 that are provided with the recess RP may be more recessed than the sides of the first conductive layer M1 and the third conductive layer M3. For example, the sides of the first conductive layer M1 and the third conductive layer M3 may protrude to a greater extent than the sides of the second conductive layer M2. By providing the recesses RP in the second conductive layer M2, an undercut structure may be provided in the first to third conductive layers M1, M2, M3.

As the second conductive layer M2 includes a different material from the first conductive layer M1 and the third conductive layer M3, an etching ratio of the second conductive layer M2 may be different from those of the first and third conductive layers M1 and M3. The recess RP may be provided by over-etching the second conductive layer M2 with an etching solution having a higher etching selection ratio with respect to the second conductive layer M2 than those with respect to the first and third conductive layers M1 and M3. Alternatively, the recess RP may be provided inside the second conductive layer M2 through an additional process for selectively etching the second conductive layer M2. If the recess RP is provided inside the second conductive layer M2, the process for providing the recess RP is not limited to any one process.

The second sensor insulation layer ISL3 may cover the second sensor conductive layer MTL2 and may be disposed on the first sensor insulation layer ISL2. The second sensor insulation layer ISL3 may contact the sides of the second conductive layer M2 that are provided with the recess RP, and cover the sides of the conductive layer M2. However, the embodiment is not necessarily limited thereto, and, as the undercut structure is disposed in the second conductive layer MTL2, the second sensor insulation layer ISL3 may be spaced apart from a portion of the side of the second conductive layer M2.

The embodiment of the inventive concept is not necessarily limited thereto, and, referring to FIG. 8B, the input sensor ISP may include the first sensor conductive layer MTL1, and the first sensor conductive layer MTL1 may include the first sensing electrodes TE1 (see FIGS. 6A and 6B), and the second sensing patterns (see FIGS. 6A and 6B). The first sensor conductive layer MTL1 may have the shape of the aforementioned mesh pattern MP (see FIGS. 7A and 7B), and be disposed in the non-emission area NPXA.

The first sensor conductive layer MTL1 may include first to third conductive layers M1, M2, M3. The second conductive layer M2 may have a different material from each of the first conductive layer M1 and the third conductive layer M3. The first conductive layer M1 may include the same material as the third conductive layer M3. However the embodiment is not necessarily limited thereto. For the description of the first to third conductive layers M1, M2, M3, the above description of the first to third conductive layers M1, M2, M3 of the second sensor conductive layer MTL2 may be applied.

Recesses RP may be defined in the sides of the first sensor conductive layer MTL1. The recesses RP may be defined in the sides of the first sensor conductive layer MTL1 that defines the mesh openings M-OP. The recesses RP may be provided such that the sides of the second conductive layer M2 of the first sensor conductive layer MTL1 are recessed inward. The sides of the first and third conductive layers M1 and M3 may protrude to a greater extent than the sides of the second conductive layer M2 provided with the recess RP, and an undercut structure may be provided in the first sensor conductive layer MTL1.

As the recesses RP are provided in at least one of the sensor conductive layers MTL1, MTL2 included in the input sensor ISP, the external light reflection ratio may be reduced by the sensor conductive layers MTL1, MTL2. The description thereof will be provided with reference to FIGS. 8A and 8C.

Referring to FIG. 8C, recesses RP might not be defined in a second sensor conductive layer MTL2' of an input sensor ISP' included in a display device DD' of a comparative embodiment. As the recesses RP are not provided, the sides of first to third conductive layers M1' M2', M3' of the second sensor conductive layer MTL2' may be arranged with each other in the comparative embodiment. For example, in the comparative embodiment, an undercut structure might not be provided in the second sensor conductive layer MTL2'.

In the comparative embodiment, external light LL1 incident from the outside travels to the display panel DP of the display device DP' may be reflected by the first electrodes AE1, AE2, AE3 of the light emitting elements OL1, OL2, OL3. A portion of the reflection light beams LL2 reflected by the first electrodes AE1, AE2, AE3 may be incident to the sides of the second sensor conductive layer MTL2'. The reflection light LL3' reflected by the second sensor conductive layer MTL2' may travel to the top side of the display device DD' due to an inclination angle of the sides of the first to third conductive layers M1', M2', M3'. Due to this, there may occur an issue that the reflection light reflected by the first electrodes AE1, AE2, AE3 and the second sensor conductive layer MTL2' may be visually recognized from the outside.

Referring to FIG. 8A, the recesses RP provided in the sides of the second sensor conductive layer MTL2 may reduce the reflection ratio of the external light LL1 that is incident to the display panel DP from outside the display device DD. FIG. 8A illustrates an example path of the external light LL1. The external light LL1 incident to the display panel DP may be reflected by the first electrodes AE1, AE2, AE3 of the light emitting elements OL1, OL2, OL3. A portion of the reflection light beams LL2 reflected by the first electrodes AE1, AE2, AE3 may be incident to a side of the second sensor conductive layer MTL2. The reflection light LL2 incident to the side of the second conductive layer M2 may have an optical path refracted by the recess RP provided in the side of the second conductive layer M2. As a result, the reflection light LL3 reflected by the second sensor conductive layer MTL2 may travel to inside the display panel DP again. Accordingly, the reflection light LL2 reflected by the first electrodes AE1, AE2, AE3 may be prevented from traveling to the top side of the display device DD and being visually recognized by the user. As a result, the external light reflection ratio of the display device DD may be reduced to reduce the visibility of the first electrodes AE1, AE2, AE3.

In addition, by providing the recesses RP in the sides the second sensor conductive layer MTL2 or the first sensor conductive layer MTL1, the visibility of the display panel DP electrodes are reduced. Therefore, cutting a portion of the sensing patterns of the input sensor ISP in order to reduce the visibility of the electrodes of the display panel DP may be omitted. For example, even when the portion of the sensing patterns is not cut, the visibility of the electrodes of the display panel DP may still be reduced by providing the recesses RP in the second sensor conductive layer MTL2 or the first sensor conductive layer MTL1. By omitting the cutting a portion of the sensing patterns, the resistance of the sensing electrodes TE (see FIGS. 6A and 6B) of the input sensor ISP may be reduced and the sensing performance of the input sensor ISP may be increased.

Hereinafter, various embodiments in which the recesses RP are provided in the sensor conductive layers MTL1, MTL2 of the input sensor ISP will be described. Hereinafter, repetitive description of like elements will be omitted, and the difference between embodiments will be mainly described. To the extent that an element is not described in detail with respect to this figure, it may be understood that the element is at least similar to a corresponding element described elsewhere within the present disclosure.

Figure 9A:
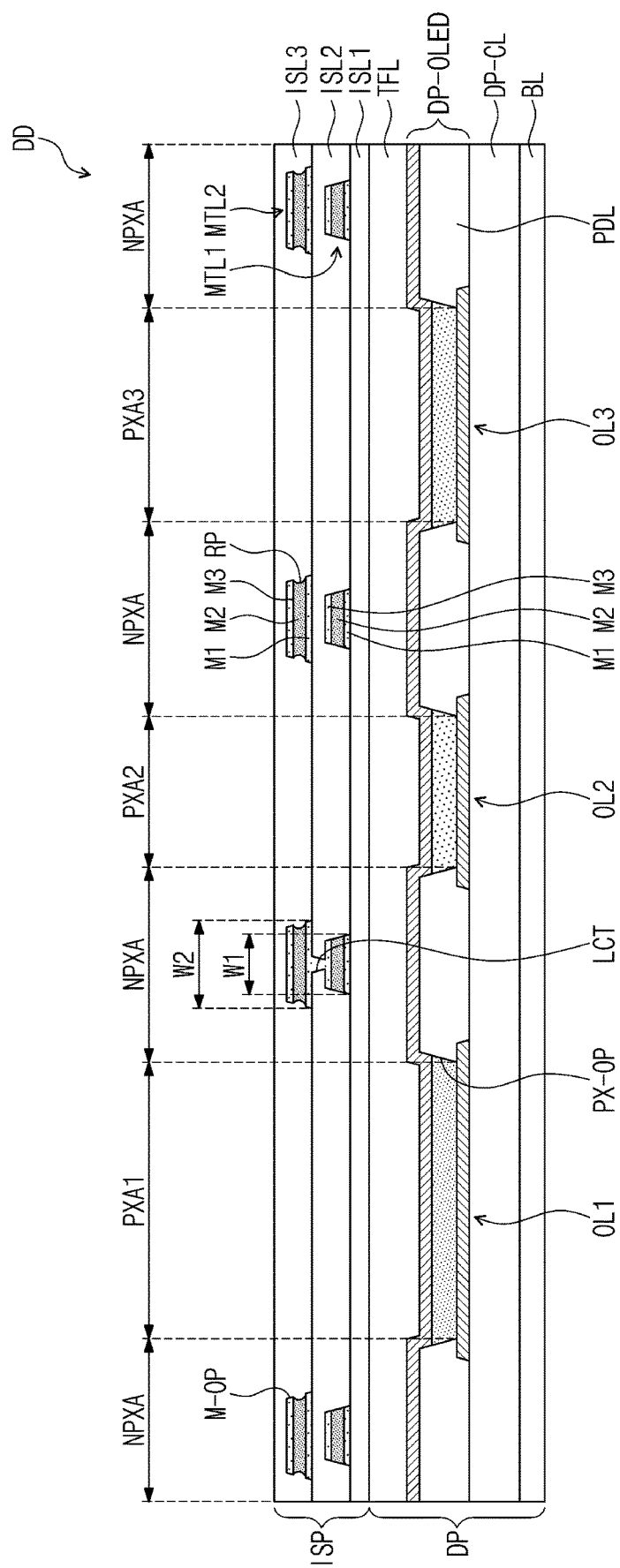
FIGS. 9A to 9B are cross-sectional views of a display device according to an embodiment of the inventive concept.
Figure 9B:
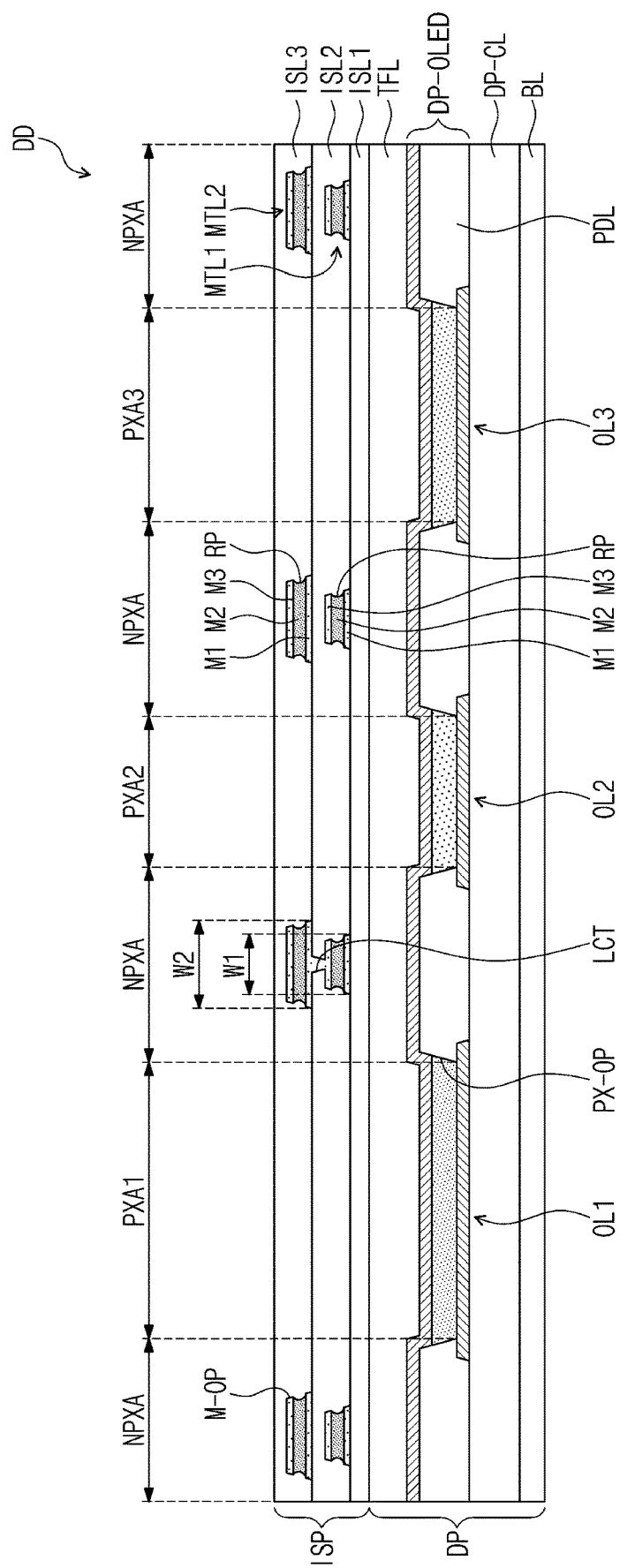

FIGS. 9A and 9B are cross-sectional views of the display device DD according to an embodiment of the inventive concept.

Referring to FIGS. 9A and 9B, the input sensor ISP may include a sensor base layer ISL1, a first sensor conductive layer ISL2, a second sensor insulation layer ISL3, a first sensor conductive layer MTL1, and a second sensor conductive layer MTL2. For the description of each component of the input sensor ISP, the above description may be applied.

The first sensor conductive layer MTL1 may include the trace lines TL1 (see FIG. 6B) and the second connection patterns BP2 (see FIG. 6B) of the second sensing electrodes TE2 (see FIG. 6B). The second sensor conductive layer MTL2 may include the first sensing electrodes TE1 (see FIGS. 6A and 6B) and the second sensing patterns SP2 (see FIG. 6B). However, the embodiment is not necessarily limited thereto.

The first sensor conductive layer MTL1 and the second sensor conductive layer MTL2 may each have the shape of the aforementioned mesh pattern MP (see FIGS. 7A and 7B), and be disposed on the non-emission area NPXA. On the non-emission area NPXA, the first sensor conductive layer MTL1 may overlap the second sensor conductive layer MTL2.

A portion of the patterns provided on the first sensor conductive layer MTL1 may be connected to a portion of patterns provided on the second sensor conductive layer MTL2 through a contact part LCT penetrating the first sensor insulation layer ISL2. For example, the first trace lines TL1 (see FIG. 6B) included in the first sensor conductive layer MTL1 may be connected through the contact part LCT to the corresponding second sensing pattern SP2 of the patterns included in the second sensor conductive layer MTL2.

In an embodiment, the first sensor conductive layer MTL1 may further include a dummy pattern overlapping the sensing patterns provided on the second sensor conductive layer MTL2 and electrically insulated from the sensing patterns. However the embodiment is not necessarily limited thereto.

The first sensor conductive layer MTL1 and the second sensor conductive layer MTL2 may respectively include the first to third conductive layers M1, M2, M3. The second conductive layer M2 may include a different material from the first conductive layer M1 and the third conductive layer M3, and the first conductive layer M1 may include the same material as the third conductive layer M3. The laminate structure of the first sensor conductive layer MTL1 may be substantially the same as that of the second conductive layer MTL2. However, the embodiment is not necessarily limited thereto. For the description of the first to third conductive layers M1, M2, M3, the above description may be applied.

The linewidth W2 (hereinafter, referred to as a second linewidth W2) of a pattern provided in the second sensor conductive layer MTL2 may be greater than the linewidth W1 (hereinafter, referred to as a first linewidth W1) of a pattern provided in the first sensor conductive layer MTL1. The side of the first sensor conductive layer MTL1 may overlap the second sensor conductive layer MTL2 in a plan view. For example, the side of the second sensor conductive layer MTL2 may be disposed farther out than the side of the first sensor conductive layer MTL1.

In the embodiment, the first linewidth W1 of the first sensor conductive layer MTL1 may correspond to the linewidth of the mesh pattern MP (see FIGS. 7A and 7B) included in the first sensor conductive layer MTL1. In an embodiment, the first sensor conductive layer MTL1 may include the second connection patterns BP2 (see FIG. 6B) having the shape of the mesh pattern MP, or the first trace lines TL1, and the first linewidth W1 of the first sensor conductive layer MTL1 may correspond to the linewidth of the second connection patterns BP2 or the first trace lines TL1.

The second linewidth W2 of the second sensor conductive layer MTL2 may correspond to the linewidth of the mesh pattern MP included in the second sensor conductive layer MTL2. In an embodiment, the second sensor conductive layer MTL2 may include the first connection patterns BP2 (see FIG. 6B) having the shape of the mesh pattern MP, the first connection patterns BP1, or the second sensing patterns SP2, and the second linewidth W2 of the second sensor conductive layer MTL2 may correspond to the linewidth of the first connection patterns BP2 or the second sensing patterns SP2.

Referring to FIG. 9A, the recesses RP may be provided in the second sensor conductive layer MTL2, and the provision of the recesses RP may be omitted in the first sensor conductive layer MTL1. For example, the recesses RP are provided in the sides of the second conductive layer M2 of the second sensor conductive layer MTL2, whereby the sides of the second sensor conductive layer MTL2 may have an undercut structure. The recess RP-unprovided sides of the first to third conductive layers M1, M2, M3 of the first sensor conductive layer MTL1 may be arranged with each other.

Among external light reflected by the first electrodes of the light emitting elements OL1, OL2, OL3, reflection light towards the side of the second conductive layer MTL2 may be refracted by the recess RP, whereby a reflection ratio of external light to be reflected to the top side of the display device DD may be reduced. As the second linewidth W2 of the second sensor conductive layer MTL2 is larger than the first linewidth W1 of the first sensor conductive layer MTL1, a process for providing the recesses RP to the first sensor conductive layer MTL1 may be omitted. Of external light reflected by the first electrodes of the light emitting elements OL1, OL2, OL3, reflection light towards the side of the first conductive layer MTL1 may be blocked by the second sensor conductive layer MTL2 from being output to the top side of the display device DD, even though the reflection light is reflected by the side of the first sensor conductive layer MTL1. Accordingly, the visibility of the electrodes of the display panel DP may be reduced. In addition, omitting the provision of the recesses RP in the sensor conductive layer MTL1 may reduce a manufacturing process load of the input sensor ISP.

The embodiment is not necessarily limited thereto, and, referring to FIG. 9B, the recesses RP may be provided to each of the first sensor conductive layer MTL1 and the second sensor conductive layer MTL2. The recesses RP are provided in the sides of the second conductive layer M2 of the first sensor conductive layer MTL1, whereby the sides of the first sensor conductive layer MTL1 may have an undercut structure. The recesses RP are provided in the sides of the second conductive layer M2 of the second sensor conductive layer MTL2, whereby the sides of the second sensor conductive layer MTL2 may have an undercut structure.

The sensor insulation layer ISL2 may cover the first sensor conductive layer MTL1 and be disposed on the second sensor insulation layer ISL3. The first sensor insulation layer ISL2 may contact the sides of the second conductive layer M2 of the first sensor conductive layer MTL1 provided with the recess RP, and cover the sides of the conductive layer M2. However, the embodiment is not necessarily limited thereto, and as the undercut structure is provided in the second conductive layer MTL1, the first sensor insulation layer ISL2 may be spaced apart from a portion of the sides of the second conductive layer MTL1.

As the recesses RP are provided to each of the first sensor conductive layer MTL1 and the second sensor conductive layer MTL2, among external light reflected by the first electrodes of the light emitting elements OL1, OL2, OL3, reflection light towards the side of the first sensor conductive layer MTL1 and reflection light towards the side of the second sensor conductive layer MTL2 may be refracted inside the display device DD by the recesses RP. As a result, a reflection ratio of external light to be reflected to the top side of the display device DD by the first electrodes of the light emitting elements OL1, OL2, OL3, the first sensor conductive layer MTL1, and the second sensor conductive layer MTL2 may be reduced. As the recesses are provided in each of the first sensor conductive layer MTL1 and the second sensor conductive layer MTL2, there are the effects of reduction in the external reflection ratio of the display device DD and reduction of the visibility of the electrodes of the display panel DP.

Figure 10A:
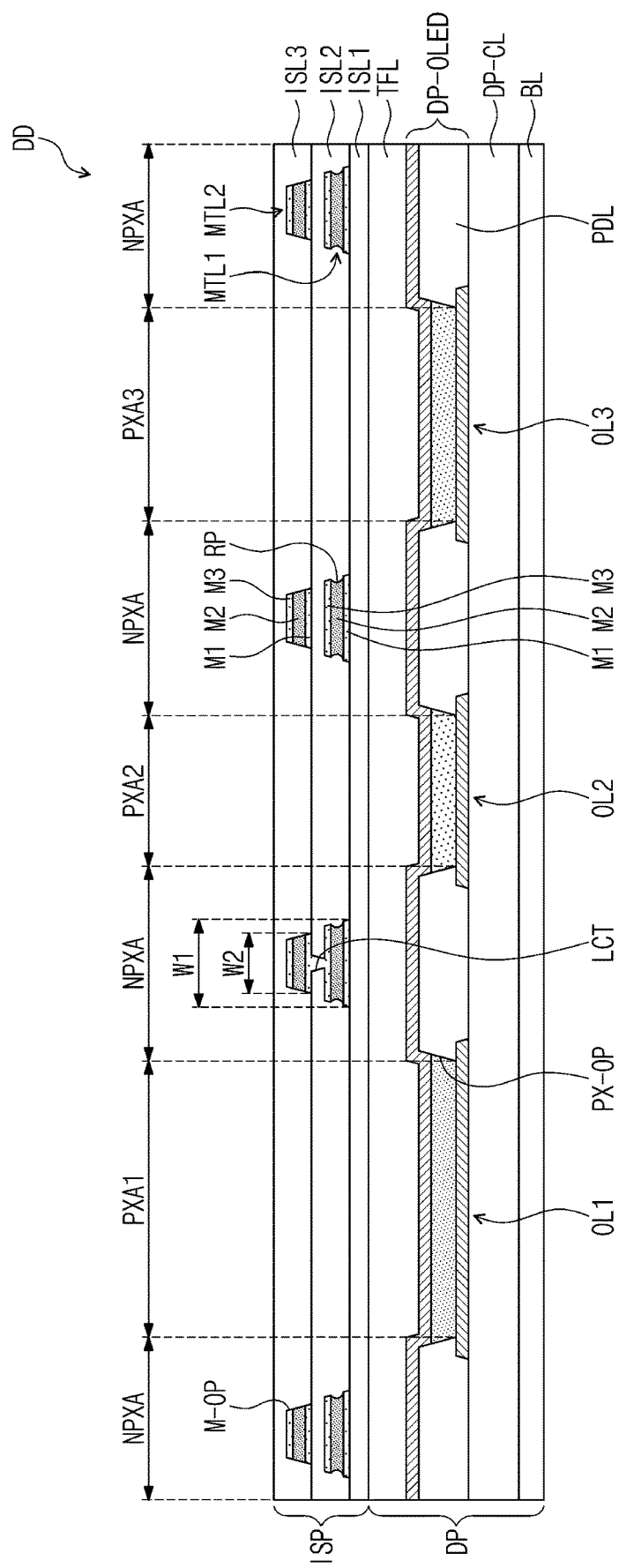
FIGS. 10A and 10B are cross-sectional views of a display device according to an embodiment of the inventive concept.
Figure 10B:
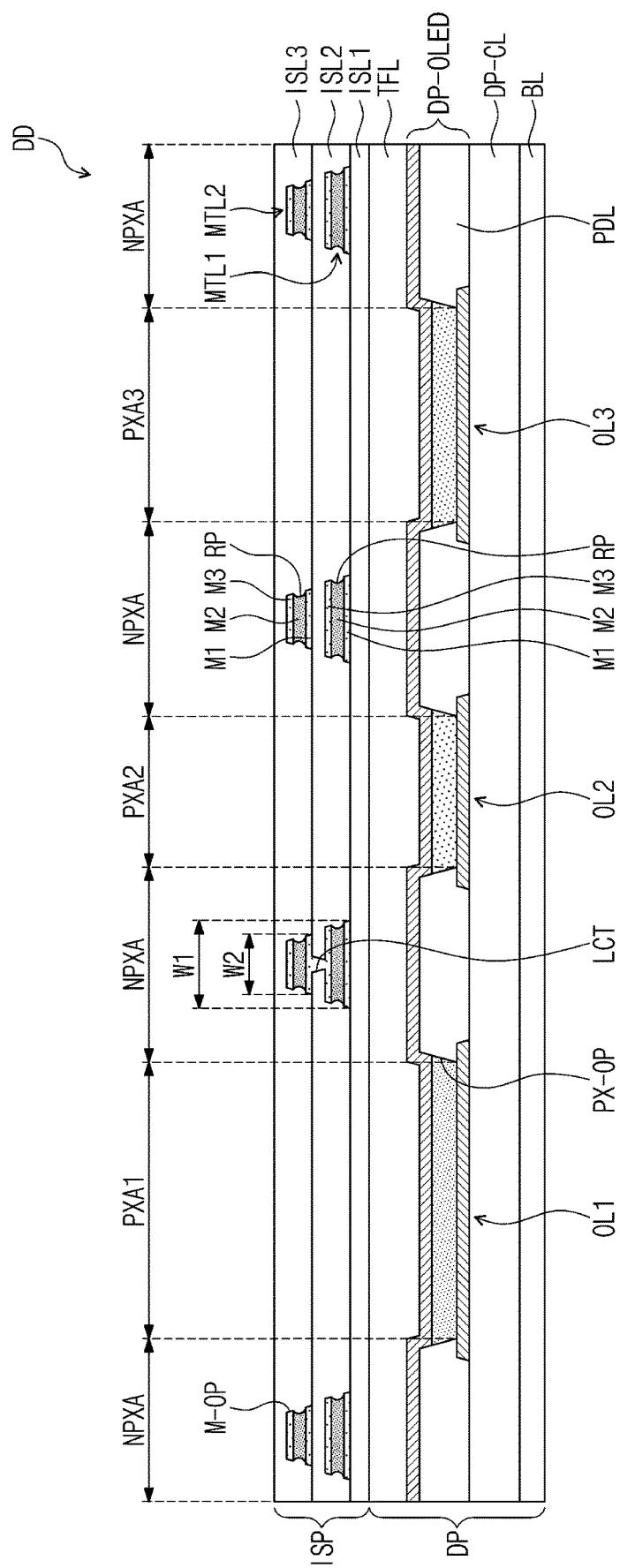

FIGS. 10A and 10B are cross-sectional views of the display device DD according to an embodiment of the inventive concept. For the description of the components shown in FIGS. 10A and 10B, the above description may be applied, and the difference between embodiments will be mainly described. To the extent that an element is not described in detail with respect to this figure, it may be understood that the element is at least similar to a corresponding element described elsewhere within the present disclosure.

Referring to FIGS. 10A and 10B, the first linewidth W1 of the pattern provided on the first sensor conductive layer MTL1 may be larger than the second linewidth W2 of the pattern provided on the second sensor conductive layer MTL2. The side of the second sensor conductive layer MTL2 may overlap the first sensor conductive layer MTL1 in a plan view. For example, the side of the first sensor conductive layer MTL1 may be disposed farther out than the side of the second sensor conductive layer MTL2.

Referring to FIG. 10A, the recesses RP may be provided in the first sensor conductive layer MTL1, and the provision of the recesses RP may be omitted in the second sensor conductive layer MTL2. For example, the recesses RP are provided in the sides of the second conductive layer M2 of the first sensor conductive layer MTL1, whereby the sides of the first sensor conductive layer MTL1 may have an undercut structure. Recess RP-unprovided sides of the first to third conductive layers M1, M2, M3 of the second sensor conductive layer MTL2 may be arranged with each other.

Among external light reflected by the first electrodes of the light emitting elements OL1, OL2, OL3, reflection light towards the side of the first conductive layer MTL1 may be refracted by the recess RP, whereby a reflection ratio of the external light to be reflected towards the top side of the display device DD may be reduced. As the first linewidth W1 of the first sensor conductive layer MTL1 is larger than the second linewidth W2 of the second sensor conductive layer MTL2, a process for providing the recesses RP to the second sensor conductive layer MTL2 may be omitted. Among external light reflected by the first electrodes of the light emitting elements OL1, OL2, OL3, reflection light towards the side of the second conductive layer MTL2 may be blocked by the first sensor conductive layer MTL1 having a larger linewidth. Accordingly, the visibility of the electrodes of the display panel DP may be reduced, and, by omitting the provision of the recesses RP in the second sensor conductive layer MTL2, a manufacturing process load of the input sensor ISP may be reduced.

The embodiment is not necessarily limited thereto, and, referring to FIG. 10B, the recesses RP may be provided to each of the first sensor conductive layer MTL1 and the second sensor conductive layer MTL2. The recesses RP may be provided to the sides of the second conductive layer M2 of the first sensor conductive layer MTL1 and the sides of the second conductive layer M2 of the second sensor conductive layer MTL2, whereby the first sensor conductive layer MTL1 and the second sensor conductive layer MTL2 may each have an undercut structure.

As the recesses RP are provided to each of the first sensor conductive layer MTL1 and the second sensor conductive layer MTL2, among external light reflected by the first electrodes of the light emitting elements OL1, OL2, OL3, reflection light towards the side of the first sensor conductive layer MTL1 and reflection light towards the side of the second sensor conductive layer MTL2 may be refracted inside the display device DD by the recesses RP. As a result, a reflection ratio of external light to be reflected to the top side of the display device DD by the first electrodes of the light emitting elements OL1, OL2, OL3, the first sensor conductive layer MTL1, and the second sensor conductive layer MTL2 may be reduced. As the recesses RP are provided in each of the first sensor conductive layer MTL1 and the second sensor conductive layer MTL2, there are the effects of reduction in the external reflection ratio of the display device DD and reduce the visibility of the electrodes of the display panel DP.

Figure 11:
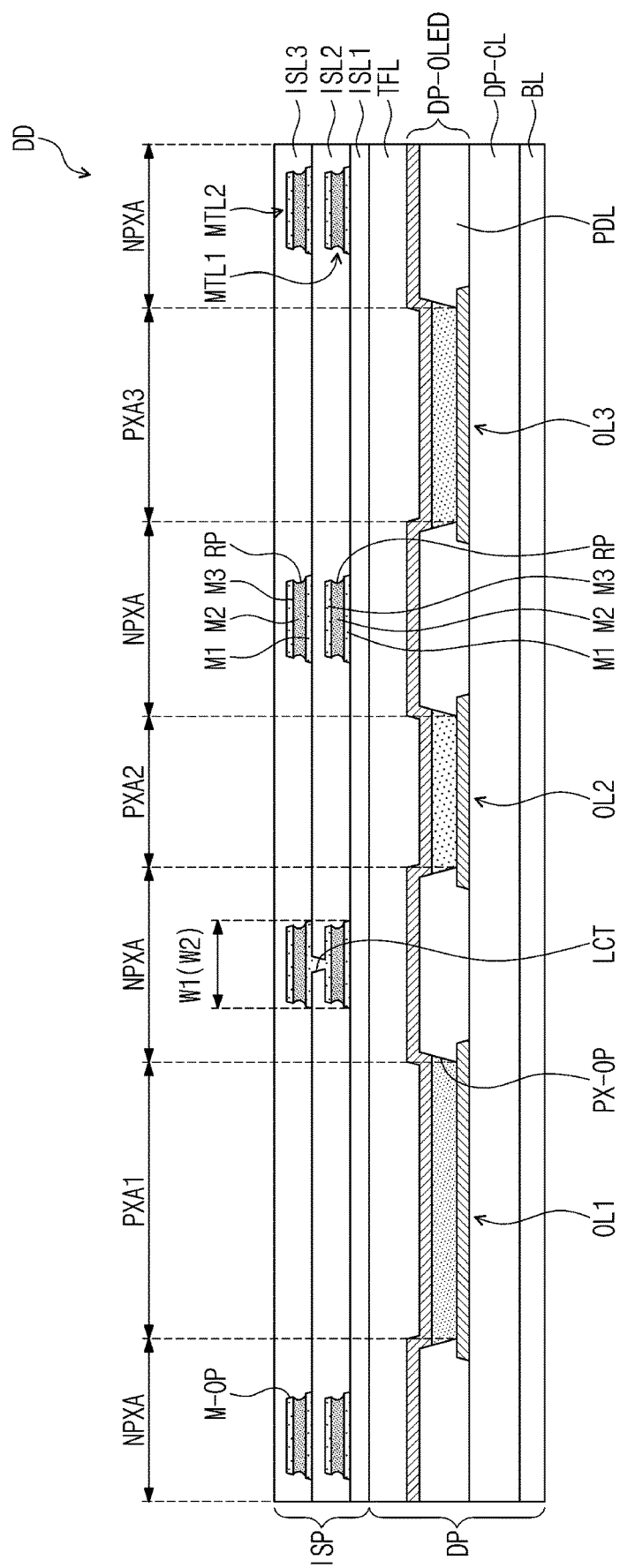
FIG. 11 is a cross-sectional view of a display device according to an embodiment of the inventive concept.

FIG. 11 is a cross-sectional view of the display device DD according to an embodiment of the inventive concept. For the description of the components shown in FIG. 11, the above description may be applied, and the difference between embodiments will be mainly described. To the extent that an element is not described in detail with respect to this figure, it may be understood that the element is at least similar to a corresponding element described elsewhere within the present disclosure.

Referring to FIG. 11, the first linewidth W1 of the pattern provided on the first sensor conductive layer MTL1 may be substantially the same as the second linewidth W2 of the pattern provided on the second sensor conductive layer MTL2. The sides of the first sensor conductive layer MTL1 may be arranged with those of the second sensor conductive layer MTL2.

The recesses RP may be provided in each of the first sensor conductive layer MTL1 and the second conductive layer MTL2. For example, the recesses RP may be provided to the sides of the second conductive layer M2 of the first sensor conductive layer MTL1 and the sides of the second conductive layer M2 of the second sensor conductive layer MTL2, whereby the first sensor conductive layer MTL1 and the second sensor conductive layer MTL2 may each have an undercut structure. However, the embodiment is not necessarily limited thereto, and the recesses RP may be provided to any one of the first sensor conductive layer MTL1 and the second sensor conductive layer MTL2.

As the recesses RP are provided to each of the first sensor conductive layer MTL1 and the second sensor conductive layer MTL2, among external light reflected by the first electrodes of the light emitting elements OL1, OL2, OL3, reflection light towards the side of the first sensor conductive layer MTL1 and reflection light towards the side of the second sensor conductive layer MTL2 may be refracted inside the display device DD by the recesses RP. As a result, a reflection ratio of external light to be reflected to the top side of the display device DD by the first electrodes of the light emitting elements OL1, OL2, OL3, the first sensor conductive layer MTL1, and the second sensor conductive layer MTL2 may be reduced.

According to an embodiment of the inventive concept, the sensing electrode of the input sensor may have the undercut structure in which the mesh opening overlaps the light emitting area is defined, and the depression part is defined on the side of the sensing electrode. Due to the mesh opening, the sensing electrode might not reduce the extraction efficiency of the light from the light emitting area. In addition, the external light reflected by the electrode of the light emitting element may have the path refracted by the recess defined in the side of the sensing electrode, whereby a reflection ratio that reflected external light is output to the top side of the display device may be reduced.

As the external reflection ratio of the display device is reduced by the recess of the sensing electrode, cutting a portion of the sensing electrode in order to reduce the visibility of the electrodes display device may be omitted, and thus the resistance of the sensing electrode may be reduced to increase the sensing performance of the input sensor.

While this invention has been described with reference to exemplary embodiments thereof, it will be clear to those of ordinary skill in the art to which the invention pertains that various changes and modifications may be made to the described embodiments without departing from the spirit and technical area of the invention.

What is claimed is:

1. A display device, comprising:
   a display panel comprising an emission area and a non-emission area proximate to the emission area; and
   an input sensor disposed on the display panel,
   wherein the input sensor comprises:
      a first sensor conductive layer disposed on the display panel;
      a first sensor insulation layer disposed on the first sensor conductive layer; and
      a second sensor conductive layer disposed on the first sensor insulation layer,
      wherein at least one of a side of the first sensor conductive layer and a side of the second sensor conductive layer comprises a recess and a mesh opening overlapping the emission area.

2. The display device of claim 1,
   wherein the second sensor conductive layer comprises a first conductive layer, a second conductive layer, and a third conductive layer that are laminated in a thickness direction of the input sensor, and
   wherein the second conductive layer comprises a different material from each of the first conductive layer and the third conductive layer.

3. The display device of claim 2, wherein the first conductive layer and the third conductive layer comprise a same material.

4. The display device of claim 2, wherein the second conductive layer comprises gold, silver, copper, aluminum, platinum or an alloy thereof.

5. The display device of claim 2,
   wherein the recess is defined in the side of the second conductive layer, and
   wherein the side of the first conductive layer and a side of the third conductive layer each protrude to a greater extent than the side of the second conductive layer.

6. The display device of claim 5,
   wherein the input sensor further comprises a second sensor insulation layer disposed on the second sensor conductive layer,
   wherein the second sensor insulation layer contacts the side of the second conductive layer that includes the recess defined therein.

7. The display device of claim 2,
   wherein the first sensor conductive layer comprises a fourth conductive layer, a fifth conductive layer, and a sixth conductive layer that are laminated in the thickness direction of the input sensor, and
   wherein the fifth conductive layer comprises a different material from that of the fourth conductive layer and the sixth conductive layer.

8. The display device of claim 7, wherein the fifth conductive layer of the first sensor conductive layer comprises a same material as the second conductive layer of the second sensor conductive layer.

9. The display device of claim 7, wherein the recess is defined in a side of the fifth conductive layer of the first sensor conductive layer, and a side of the fourth conductive layer and a side of the sixth conductive layer protrudes to a greater extent than the side of the fifth conductive layer.

10. The display device of claim 1,
    wherein the first sensor conductive layer and the second sensor conductive layer each comprise a first mesh pattern and a second mesh pattern, and
    wherein at least a portion of the second mesh pattern of the second sensor conductive layer corresponds to:
       first sensing patterns arranged in a first direction; and
       second sensing patterns electrically insulated from the first sensing patterns and arranged in a second direction intersecting with the first direction.

11. The display device of claim 10, wherein at least a portion of the first mesh pattern corresponds to trace lines connected to corresponding first sensing patterns among the first sensing patterns through a contact part penetrating through the first sensor insulation layer.

12. The display device of claim 11, wherein the recess is defined in a side of the second mesh pattern and a linewidth of the first mesh pattern overlapping the second mesh pattern is smaller than that of the second mesh pattern.

13. The display device of claim 11, wherein the recess is defined in a side of the first mesh pattern and a linewidth of the second mesh pattern overlapping the first mesh pattern is smaller than that of the first mesh pattern.

14. The display device of claim 11, wherein the recess is defined in a side of the first mesh pattern and a side of the second mesh pattern, and a linewidth of the first mesh pattern is substantially equal to that of the second mesh pattern.

15. A display device, comprising:
    a display panel comprising a display area; and
    an input sensor comprising a sensing area overlapping the display area and disposed on the display panel,
    wherein the input sensor comprises:
       first sensing electrodes, each of which comprises first sensing patterns arranged in a first direction, the first sensing electrodes disposed on the sensing area; and
       second sensing electrodes, each of which comprises second sensing patterns arranged in a second direction intersecting with the first direction, the second sensing electrodes disposed on the sensing area,
    wherein each of the first sensing patterns and the second sensing patterns comprise a recess and a mesh opening,
    wherein each of the first sensing patterns and the second sensing patterns comprise a first conductive layer, a second conductive layer, and a third conductive layer that are laminated in a thickness direction of the input sensor, and wherein the recess is defined in a side of the second conductive layer.

16. The display device of claim 15,
wherein the second conductive layer comprises a different material from that of the first conductive layer and the third conductive layer.

17. The display device of claim 16,
wherein the input sensor further comprises trace lines disposed on a different layer from the first sensing patterns, and respectively connected to the first sensing electrodes through a contact part, and wherein the contact part overlaps the sensing area.

18. The display device of claim 17, wherein a linewidth of the trace lines is smaller than that that of the first sensing patterns.

19. The display device of claim 17,
wherein the trace lines comprise a fourth conductive layer, a fifth conductive layer, and a sixth conductive layer that are laminated in the thickness direction of the input sensor, and wherein the fourth to sixth conductive layers respectively comprise same materials as the first to third conductive layers.

20. The display device of claim 19, wherein the recess is defined in a side of the fifth conductive layer of the trace lines.

* * * * *